United States Patent [19]

Ingraham et al.

[11] Patent Number: 5,010,972
[45] Date of Patent: Apr. 30, 1991

[54] COMBINATION VEHICULAR BRAKING AND ACCESSORY CONTROL SYSTEM

[75] Inventors: Ronald D. Ingraham; Todd M. Nykerk; Peter H. Strom, all of Reed City, Mich.

[73] Assignee: Nartron Corporation, Reed City, Mich.

[21] Appl. No.: 375,946

[22] Filed: Jul. 6, 1989

[51] Int. Cl.$^5$ ............................................. B60K 31/02
[52] U.S. Cl. ................................. 180/178; 180/197; 192/0.082; 192/1.26; 200/61.89; 280/703; 338/108; 340/479; 340/488; 340/489
[58] Field of Search ............. 192/0.082, 1.26; 338/99, 108, 153, 114; 340/479, 488, 489; 200/61.89; 280/703; 180/197, 176, 177, 178

[56] References Cited

U.S. PATENT DOCUMENTS

| | | | |
|---|---|---|---|
| 2,091,086 | 7/1937 | Taylor | 177/337 |
| 2,232,447 | 2/1941 | Griffith | 200/61.89 |
| 2,276,028 | 3/1942 | Dick | 200/61.89 |
| 2,445,660 | 7/1948 | Bruestle | 201/50 |
| 2,454,291 | 11/1948 | Penrose | 201/51 |
| 2,530,131 | 11/1950 | Roters | 318/261 |
| 2,674,669 | 4/1954 | Leedam | 200/86.5 |
| 2,832,863 | 4/1958 | Quimby | 200/61.89 |
| 3,125,739 | 3/1964 | Deibel et al. | 338/99 |
| 3,171,917 | 3/1965 | Leichsenring | 200/86.5 |
| 3,219,775 | 11/1965 | Carpenter | 200/61.89 |
| 3,390,243 | 6/1968 | Obermann | 200/166 |
| 3,398,992 | 8/1968 | Littmann | 303/20 |
| 3,419,115 | 12/1968 | Glenn | 192/2 |
| 3,439,323 | 4/1969 | Kersting | 340/52 |
| 3,574,414 | 4/1971 | Jacob | 303/7 |
| 3,581,028 | 5/1971 | Valbona | 200/38 |
| 3,622,723 | 11/1971 | Fischel | 200/86 R |
| 3,711,162 | 1/1973 | Steinbrenner et al. | 303/21 R |
| 3,766,342 | 10/1973 | Stadelmann | 200/61.89 |
| 3,802,745 | 4/1974 | Strifler et al. | 303/3 |
| 3,814,484 | 6/1974 | Matthews et al. | 303/20 |
| 3,823,985 | 7/1974 | Hubbard | 303/7 |
| 3,827,758 | 8/1974 | Hansen | 303/3 |
| 3,838,888 | 10/1974 | Gynn | 303/20 |
| 3,840,276 | 10/1974 | Jubenville | 303/20 |
| 3,882,442 | 5/1975 | Hubbard | 338/42 |
| 3,911,394 | 10/1975 | Shames | 340/71 |
| 3,981,542 | 9/1976 | Abrams et al. | 303/20 |
| 4,005,759 | 2/1977 | Farr | 180/65 R |
| 4,145,317 | 3/1979 | Sado et al. | 252/512 |
| 4,152,304 | 5/1979 | Tadewald et al. | 252/506 |
| 4,163,204 | 7/1979 | Sado et al. | 338/114 |
| 4,297,550 | 10/1981 | Leighton | 200/61.89 |
| 4,404,439 | 9/1983 | Leighton | 200/61.89 |
| 4,419,653 | 12/1983 | Walgand | 338/114 |
| 4,441,097 | 4/1984 | Anderson | 340/365 A |
| 4,602,702 | 7/1986 | Ohta et al. | 188/72.1 |
| 4,639,710 | 1/1987 | McMillan et al. | 338/108 |
| 4,658,939 | 4/1987 | Kircher et al. | 188/156 |
| 4,784,442 | 11/1988 | Petersen | 303/15 |
| 4,818,036 | 4/1989 | Reinecke | 303/50 |

*Primary Examiner*—Andres Kashnikow
*Assistant Examiner*—Eric Culbreth
*Attorney, Agent, or Firm*—Lon H. Romanski

[57] ABSTRACT

An automotive vehicle having accessories as for example cruise control, transmission torque converter lock-up control, or anti-dive suspension control, has an electrical logic circuit which is effective for applying control type signals to such accessories in response to magnitude of the force applied to the vehicular braking system by the driver; a force sensitive resistor placed in the vehicular braking system is effective to create output signals to the logic circuit which signals are employed by the logic circuit to determine when respective control type signals are to be applied to such accessories.

22 Claims, 10 Drawing Sheets

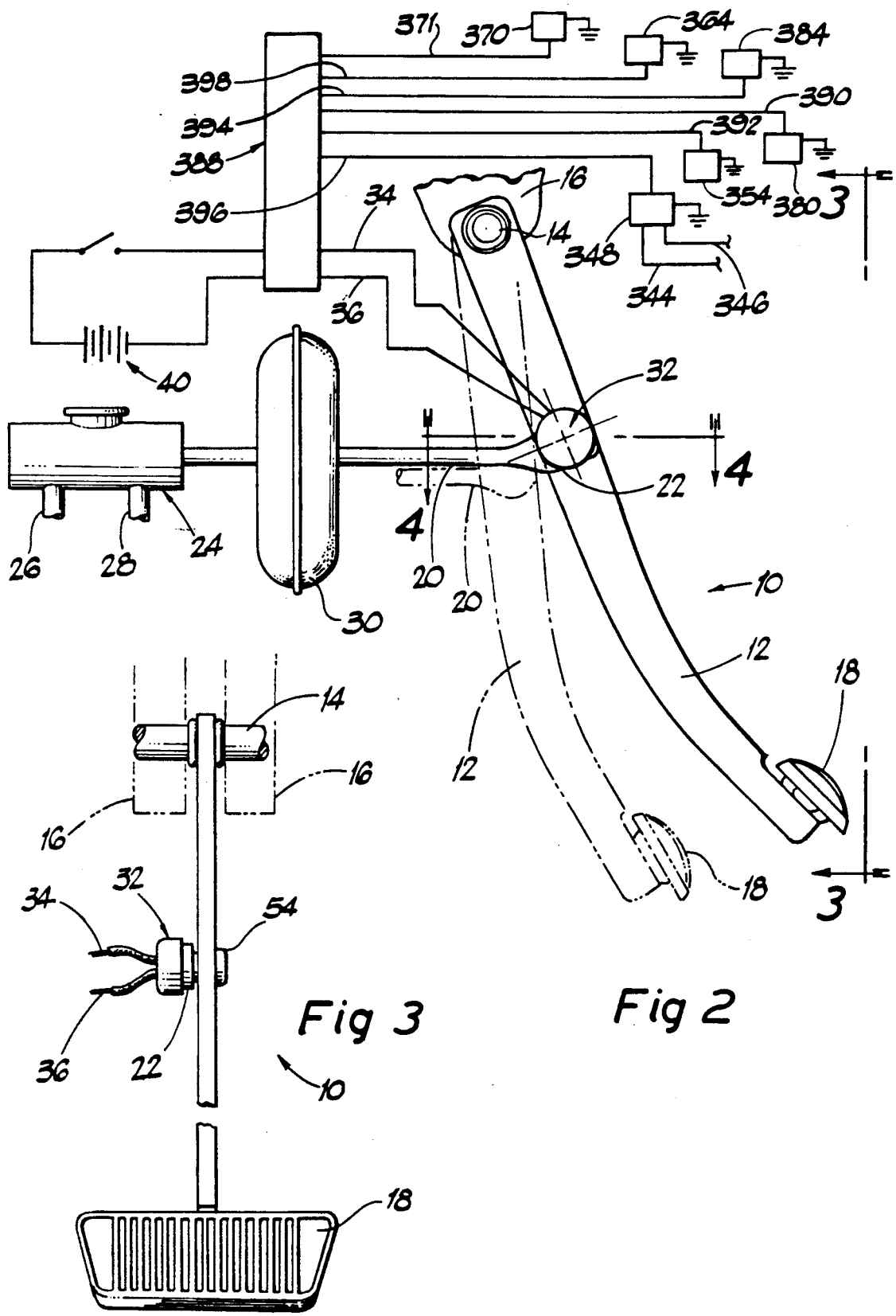

5,010,972

COMBINATION VEHICULAR BRAKING AND ACCESSORY CONTROL SYSTEM

FIELD OF THE INVENTION

This invention relates generally to electrical switching means and more particularly to switching means responsive to applied forces for in turn providing outputs employable in initiating or terminating related events.

BACKGROUND OF THE INVENTION

Heretofore motor vehicle braking systems typically employed mechanical switches which were fastened to the structure of the vehicle as to be in operative contact with the brake pedal for indicating the depression of the brake pedal. Whenever the brake pedal was depressed, the switch closed thereby causing the vehicular stop lights to be energized.

Other prior art systems employed fluid pressure switches which, generally, were connected to the vehicular brake system hydraulic actuating circuitry and were responsive to and actuated by pressure changes in the hydraulic fluid. Such fluid pressure switches, when actuated by a sufficient hydraulic pressure, also served to cause the vehicular stop lights to be energized. Occasionally, fluid leakage would occur, in the area where such pressure switch was mounted, resulting in loss of hydraulic brake actuating fluid and consequent failure of the vehicular braking system.

Still other prior art systems employed in-line mechanical switches comprising an operative connection in the mechanical linkage of the vehicular brake system. Generally, such switches were mounted for movement with the linkage and as such increased the magnitude of the required actuating pressure a force to be applied by the vehicular operator.

Such prior art systems either require a form of adjustment, both when initially assembling the switch into the system and during the life of the system because of linkage wear, or in effect provide an additional weak link in the vehicular braking system. This, of course, involves both labor and additional supporting structure which, when multiplied by the number of motor vehicles built in a given period of time, results in extra costs and expenses.

Further, in such prior art systems, the slight force or pressure applied to a vehicular brake pedal by the vehicular driver, as through the inadvertent resting of the driver's foot on the brake pedal, usually causes the associated switch to be actuated even though the brake system is not being energized. Obviously, having the vehicular stop lights thusly become energized, when the vehicle in fact is not undergoing braking, gives a false warning to the following vehicles thereby destroying the safety value of the stop lights. Also, such prior art switches are generally slow acting and switch failure due to electrical contact erosion is not uncommon.

Automotive vehicles are also often provided with one or more signalling or control devices that ideally provide appropriate signals when the vehicular brakes are actuated. For example, some vehicles are provided with vehicular speed control units which, for safety reasons, should be deactivated as upon initiation of the vehicular braking system. Other vehicles are provided with automatic power transmissions which include means associated therewith for causing the transmission torque converter to lock-up into an operatively solid condition once the vehicle has attained a preselected vehicular speed. Again, for safety reasons, it is desired that the lock-up condition of the torque converter be deactivated upon a preselected vehicular braking force being applied. Further, some vehicles equipped with automatic power transmission assemblies may be provided with interlock means for preventing unintentional vehicle acceleration. This often takes the form of an interlock mechanism preventing the movement of the transmission selector lever from either "park" or "neutral" positions to any other operating condition unless first the vehicular braking system is sufficiently energized. Still other vehicles may be provided with anti-dive type systems or devices which are intended to prevent the excessive downward movement of the front of the vehicle upon energization of the vehicular brake system. Still further, other vehicles may be provided with anti-skid devices, in combination with the vehicular wheel brake assemblies which are sensitive as to the lock-up of the related wheel and which in turn create, at that wheel, a pumping-like action to prevent continued wheel lock-up and instead bring the vehicle to a stop by rapid intermittent energization of the vehicular brake system even though the driver may maintain a maximum force against the vehicular brake pedal assembly. In such anti-skid systems, there are times at which the anti-skid portion of the wheel brake system is desired to be overriden or released from operation.

In any and all of such situations various switches have been employed and calibrated for, in effect, single function duty. Such a proliferation of switches is not only costly but renders each as being a possible source of problems due to, for example, loss of proper calibration or other forms of failure or loss of assured integrity.

The invention as herein disclosed and described is primarily directed to the solution of the aforestated as well as other related and attendant problems of the prior art.

SUMMARY OF THE INVENTION

According to the invention wherein a first movable element is employed for moving a second movable element, a signal generating means for indicating when preselected magnitudes of force are applied to said first movable element in the act of at least tending to move said second movable element comprises force sensitive electrical resistance means, wherein said force sensitive electrical resistance means varies its electrical resistance in response to the magnitude of force applied thereto, and wherein said electrical resistance means is situated as to experience thereagainst a reaction-force developed in response to said force applied to said first movable element, said force sensitive electrical resistance means being effective upon said reaction-force attaining selected magnitudes to produce corresponding magnitudes of electrical resistance which, at each of said magnitudes of resistance, signals the attainment of respective ones of said selected magnitudes of force applied to said first movable element.

Various general and specific objects, advantages and aspects of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be omitted from one or more views:

FIG. 2 is a side elevational relatively enlarged view of the automotive brake pedal assembly of FIG. 1 shown in combination with environmental structure and electrical circuitry some of which is generally diagrammatically illustrated while other portion are schematically illustrated;

FIG. 3 is a view taken generally on the plane of line 3—3 of FIG. 2 and looking in the direction of the arrows;

DETAILED DESCRIPTION OF THE PREFERRED EMBODIMENT

Figure 1:
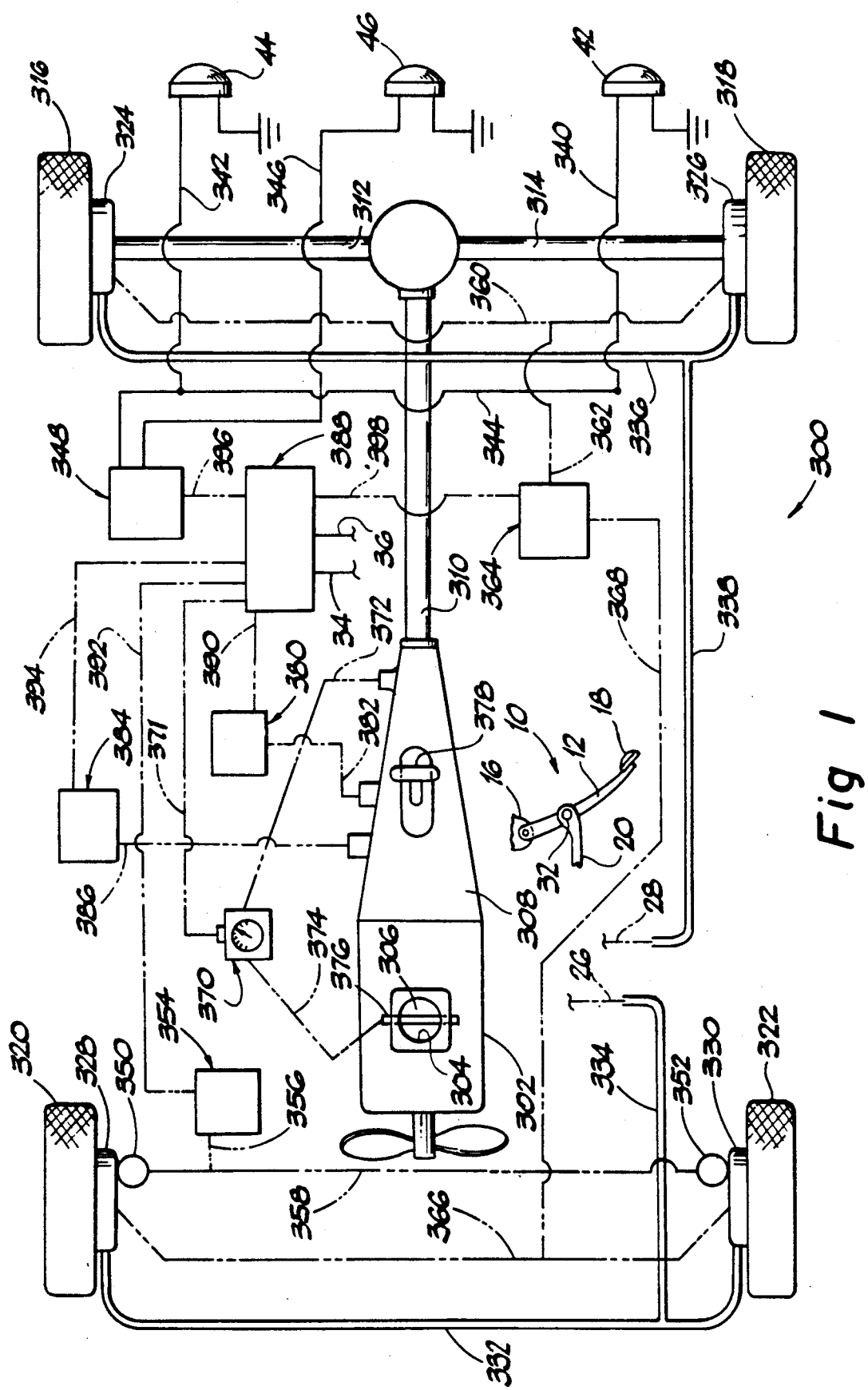
FIG. 1 is both a diagrammatic and schematic view of an automotive vehicle provided with certain diagrammatically depicted accessories and illustrating a portion of a brake lever assembly working in combination with other illustrated means in accordance with the teachings of the invention.

Referring now in greater detail to the drawings, FIG. 1 illustrates an automotive vehicle 300 having an engine 302 with an engine induction passage 304 variably controlled as by a selectively positionable and openable throttle valve 306. The engine 302 is operatively connected to associated transmission means 308, in this instance assumed to be an automatic transmission, which via drive shaft means 310 is effective to drive axle assemblies 312 and 314 respectively leading to rearwardly situated vehicular ground engaging driving wheels 316 and 318. Forwardly situated ground engaging vehicular steering wheels are respectively depicted at 320 and 322.

Wheel assemblies 316, 318, 320 and 322 are respectively provided with wheel brake assemblies 324, 326, 328 and 330 each of which may be provided with anti-skid devices (not specifically shown but various forms of which are known in the art).

Conduit means 332 interconnecting wheel brake assemblies 328 and 330 is, in turn, in communication with conduit means 334 operatively connected as to supply conduit means 26 shown in FIG. 2. Similarly, conduit means 336 interconnecting wheel brake assemblies 324 and 326 is, in turn, in communication with conduit means 338 operatively connected as to supply conduit means 28 shown in FIG. 2. As is well known in the art conduit means 332, 334, 336 and 338 serve to convey brake assembly actuating hydraulic fluid; as is also well known, in the alternative, conduit means 332 may be arranged to communicate as between and with wheel brake assemblies 328 and 326 while conduit means 336 may be arranged to instead communicate as between and with wheel brake assemblies 324 and 330.

Rearward mounted stop lights or lamp assemblies 42, 44 and 46 are electrically connected, as via conductor means 340, 342, 344 and 346 to associated control or switching means 348.

The forward vehicular suspension means may be provided with suitable anti-dive means and such are depicted at 350 and 352 and, as is known in the art, serve to limit the amount that the forward part of the vehicle moves downwardly during, as for example, when the vehicle is experiencing strong braking. Suitable control means 354 is operatively connected, as depicted by phantom lines 356 and 358, to the anti-dive means 350 and 352.

The anti-skid devices, previously referred to, may be considered as being contained within the depicted wheel brake assemblies 324, 326, 328 and 330. The anti-skid devices in wheel brake assemblies 324 and 326 may be operatively connected, as depicted by phantom lines 360 and 362, to related control means 364. Similarly, the anti-skid devices in wheel brake assemblies 328 and 330 may be operatively connected, as depicted by phantom lines 366 and 368 to the same related control means 364.

Also, the vehicle 300 may be provided with what is commonly referred to in the art as a cruise control with which the driver is able to select a desired vehicular speed and, upon activation by the driver of such cruise control, the desired vehicular speed is automatically maintained. In FIG. 1, such cruise control is schematically depicted at 370 and is shown as having a vehicular speed input applied thereto as by suitable transmission means, depicted in phantom line 372, and an output, depicted in phantom line 374, leading as to the throttle shaft 376 in order to regulate the positioning of the throttle valve 306 to maintain selected vehicular speed.

The vehicle 300 may also be provided with what is commonly referred to as an unintentional acceleration interlock means, comprising for example a portion of the power transmission means 308. Generally, although various specific devices are known in the art, the purpose and function of such interlock means is to prevent the movement of the transmission selector lever 378 from its "neutral" or "park" positions unless first the vehicular brake pedal means is sufficiently actuated as to correspondingly energize the vehicular braking system. In FIG. 1, the related control means for activating and de-activating the said interlock is depicted at 380 and is operatively connected to the interlock means, as within or associated with the power transmission 308, as via suitable transmission means depicted in phantom line 382.

Further, still with reference to FIG. 1, the vehicle 300 is illustrated as being provided with means, as within the power transmission assembly 308, which, upon the vehicle attaining a preselected vehicular speed, causes the transmission torque converter to lockup thereby providing for a solid power drive therethrough. Associated control means therefor is depicted at 384 and shown operatively connected to the mechanism for permitting such torque converter lock-up, as well as the disengagement thereof, as by phantom line 386.

What may be considered a master logic and control circuit means is depicted at 388 and provides output signals to the various depicted control means as generally illustrated by phantom lines 371, 390, 392, 394, 396 and 398.

Vehicular brake lever assembly means is partially illustrated at 10 with such, and associated structure and means, being illustrated in greater detail in the following drawing FIGS.

FIGS. 2 and 3 illustrate a portion of an overall braking system of the associated automotive vehicle 300. The brake pedal means 10 is depicted as comprising a lever body 12 pivotally connected, at its upper end, as by pivot means 14 operatively connected to journal or pivot support means 16 which, in turn, may comprise a portion of the vehicular structure. The lower end of lever body 12 carries a brake pedal 18 suitably secured thereto.

A brake actuating rod or push rod 20 has its right end 22 (as viewed in FIG. 2) pivotally connected to brake lever 12. When the brake pedal assembly 10 is actuated by the vehicular driver, from its null or inactive state as depicted in solid line in FIG. 2 to its assumed maximum braking force as depicted in phantom line in FIG. 2, the push rod or brake rod 20 moves toward the left (as viewed in FIG. 2) as to cause a hydraulic displacement in an associated vehicular brake system master cylinder assembly 24 thereby applying a hydraulic pressure, as via conduit means 26 and 28 to the respective wheel brake assemblies 324, 326, 328 and 330 of the associated vehicle as through conduit means 334 and 336. Such application of a braking force may be done directly by the brake rod or arm 20 or through associated power assist means depicted at 30.

The operative connection as between the brake rod 20 and brake lever 12 comprises a signal mechanism 32 which is effective for creating electrical signals when selected magnitudes of force are applied to the brake pedal 18. When such electrical signals are applied via conductor means 34 and 36 to related electrical logic means 388, solid state or otherwise, the vehicular source of emf 40 energizes the various controls of FIG. 1.

Figure 4:
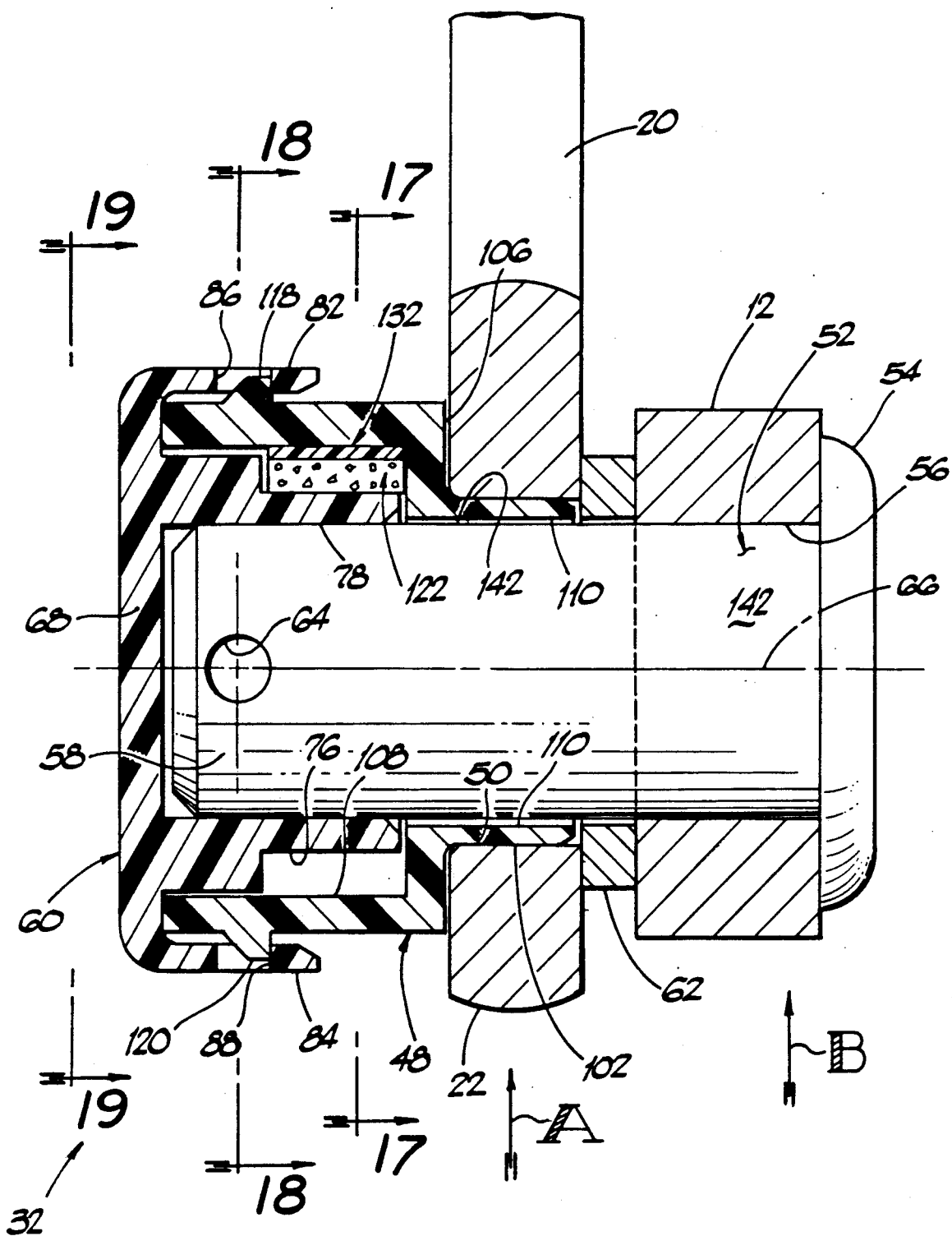
FIG. 4 is a cross-sectional view, in relatively enlarged scale, taken generally on the plane of line 4—4 of FIG. 2 and looking in the direction of the arrows.

Referring to FIG. 4, the signal mechanism or sensor assembly 32 is illustrated as comprising a first generally tubular member 48, of stepped cylindrical diameter received within and by a cooperating passage or aperture 50 formed through the push rod or brake rod 20. A cylindrical pin or cross-member 52, having a head 54, received by a passage or aperture 56 in brake lever 12, extends through at least a portion of member 48 as to have its left-most end 58 (as viewed in FIG. 4) received by a counterbore of a generally outermost member 60. In the embodiment depicted, a passage 64 is formed through pin or cross-member 52 preferably as to have its longitudinal axis normal to the center-line or longitudinal axis 66 of pin 52. If desired, an annular spacer 62 may be provided as between brake lever 12 and brake rod 20.

Referring to FIGS. 5, 6, 7 and 8, the outermost member 60, which may be considered, for example, as a cover, bearing and/or carrier, is illustrated as comprising a circular or disk-like axial end wall 68 which is integrally formed with a first generally axially aligned tubular wall portion 70, having an outer cylindrical surface 72, and a second axially aligned tubular wall portion 74 having an outer cylindrical surface 76 of an outer diameter significantly less than that of surface 72. The wall portions 70 and 74 define an inner cylindrical surface 78 which is open at the right (as viewed in FIG. 7) or outermost end thereof as at 80.

Figure 6:
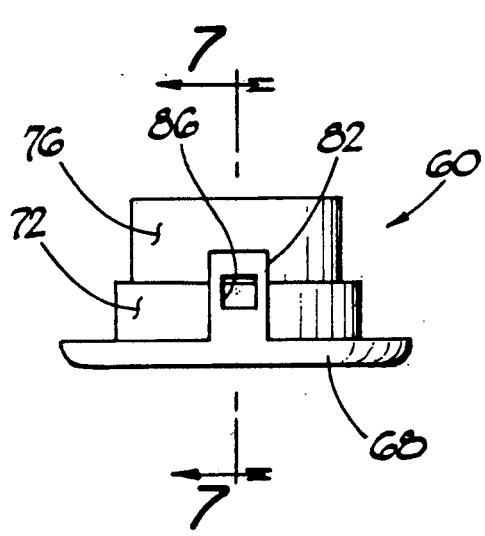
FIG. 6 is a view taken generally on the plane of line 6—6 of FIG. 5 and looking in the direction of the arrows.
Figure 7:
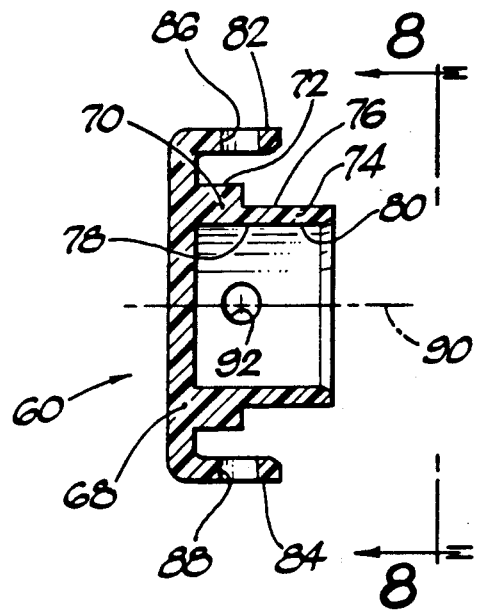
FIG. 7 is a cross-sectional view taken generally on the plane of line 7—7 of FIG. 6 and looking in the direction of the arrows.
Figure 5:
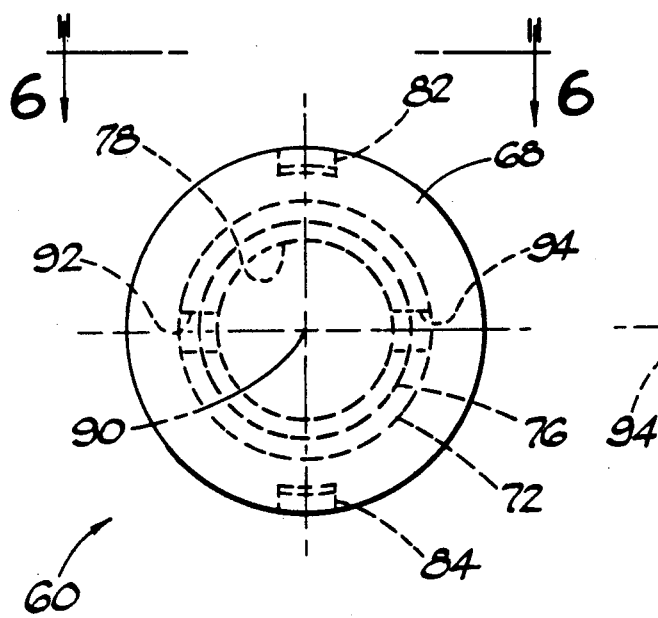
FIG. 5 is an axial end elevational view, in relatively reduced scale, of one of the elements shown in FIG. 4.
Figure 8:
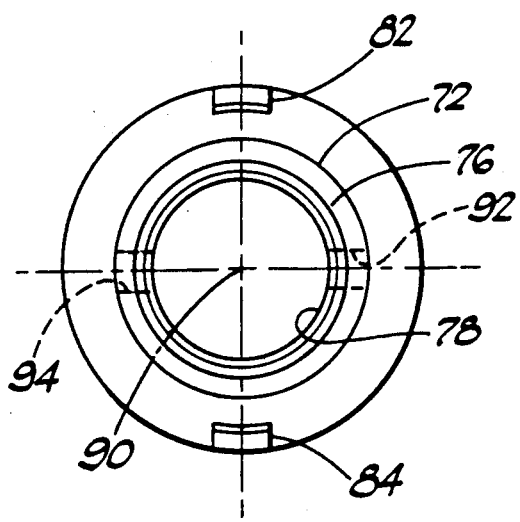
FIG. 8 is a view taken generally on the plane of line 8—8 of FIG. 7 and looking in the direction of the arrows.
Figure 12:
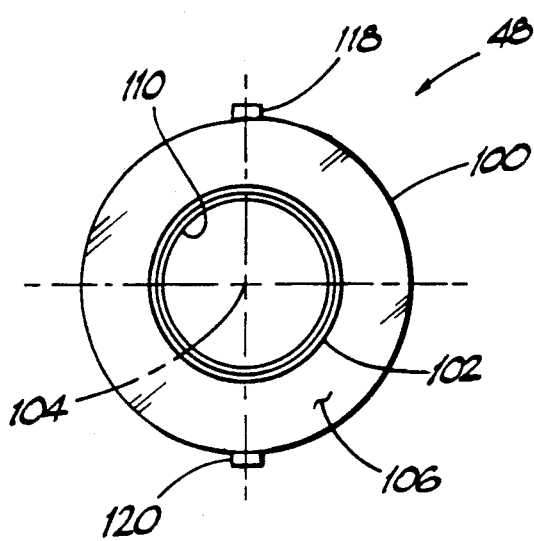
FIG. 12 is a view taken generally on the plane of line 12—12 of FIG. 9 and looking in the direction of the arrows.

In the preferred embodiment, the disk-like end portion 68 of carrier 60 is provided with integrally formed diametrically situated arms 82 and 84 which, in turn, have generally squared holes or passages 86 and 88 formed therethrough. As best seen in FIGS. 6 and 7, the arms 82 and 84 extend from end wall 68 generally parallel to the axis 90 of member 60. Also, as shown in each of FIGS. 5, 7 and 8, preferably diametrically aligned passageways 92 and 94 are formed through the walls of the tubular portion of member 60. In the preferred embodiment, the end cover or carrier 60 is formed of suitable plastic material as, for example, a 30% glass reinforced polyester. Such could be, for example, "Rynite" which is a United States of America registered trademark, of DuPont de Nemours, E. I. & Co. of Wilmington, Del., for a glass-reinforced polyester; a modified polyethylene terephthalate featuring high temperature resistance, high tensile and impact strength and good electrical resistance.

FIGS. 9, 10, 11 and 12 illustrate the housing 48 (of FIG. 4) as comprising a first relatively large generally tubular cylindrical body portion 96 which is integrally formed with a second relatively small generally tubular cylindrical body portion 98. Body portions 96 and 98 are respectively provided with outer cylindrical surface 100 and 102 which are substantially concentric to each other and having an axis 104. A generally radially directed annular shoulder surface 106 effectively interconnects outer cylindrical surfaces 100 and 102.

Figure 11:
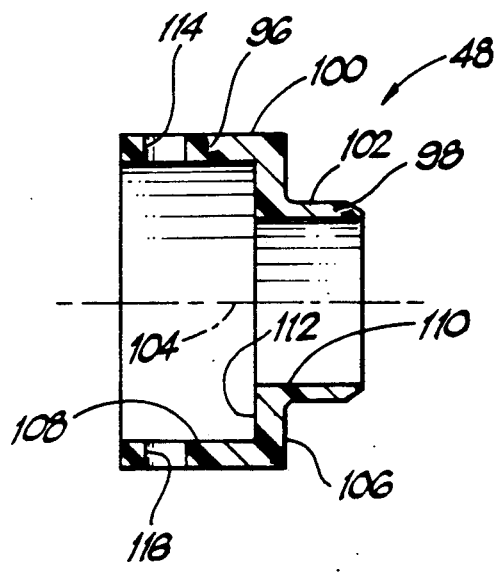
FIG. 11 is an axial cross-sectional view taken generally on the plane of line 11—11 of FIG. 9 and looking in the direction of the arrows.
Figure 10:
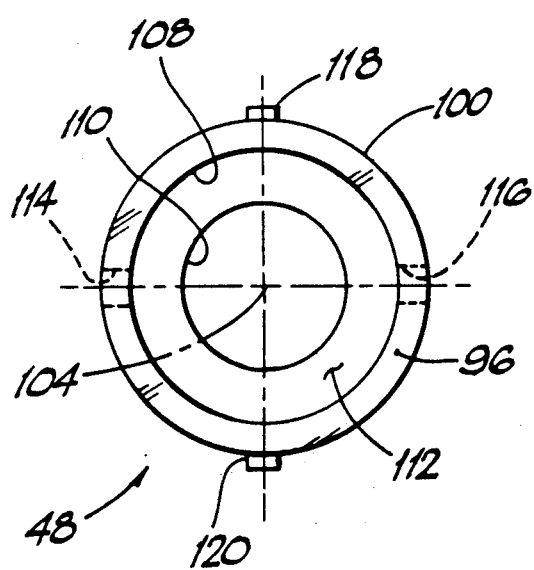
FIG. 10 is a view taken generally on the plane of line 10—10 of FIG. 9 and looking in the direction of the arrows.
Figure 9:
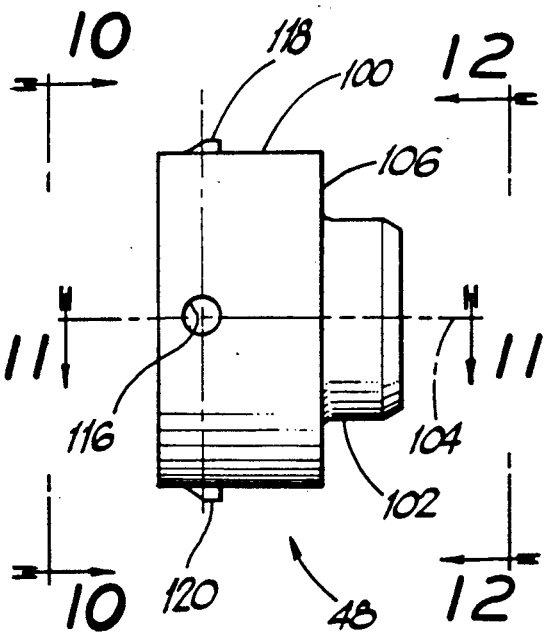
FIG. 9 is a side elevational view, in relatively reduced scale, of another element shown in FIG. 4.

Somewhat similarly, body portions 96 and 98 are respectively provided with inner cylindrical surfaces 108 and 110 which are substantially concentric to each other and also have the same axis 104. The cylindrical surface 110 is a through passage while cylindrical surface 108 ends as at an internal radially directed annular surface 112. As shown in each of FIGS. 9, 10 and 11, aligned passageways 114 and 116, preferably on diameter, are formed through the walls of the cylindrical body portion 96. As seen in FIGS. 9, 10 and 11, a plurality of diametrically opposed ear-like locking or detent portions 118 and 120 are preferably integrally formed with cylindrical body portion 96 as to extend radially outwardly of outer cylindrical surface 100.

In the preferred embodiment the housing or force transfer member 48 is formed of a suitable plastic material which, for example, may be the same material comprising member 60 as already herein described.

Figures 13, 15:
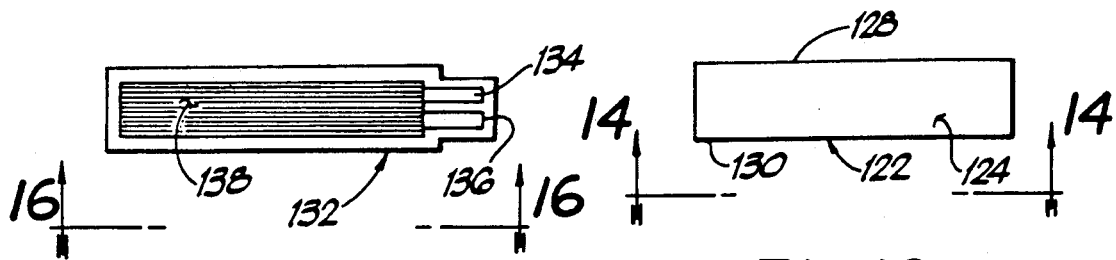
FIG. 13 is a top plan view of still another element shown in FIG. 4, as well as in FIG. 17.
FIG. 15 is a top plan view of another element shown in FIG. 4, as well as in FIG. 17.
Figures 14, 16:
FIg. 14 is a view taken generally on the plane of line 14—14 of FIG. 13 and looking in the direction of the arrows.
FIG. 16 is a view taken generally on the plane of line 16—16 of FIG. 15 and looking in the direction of the arrows.
Figure 17:
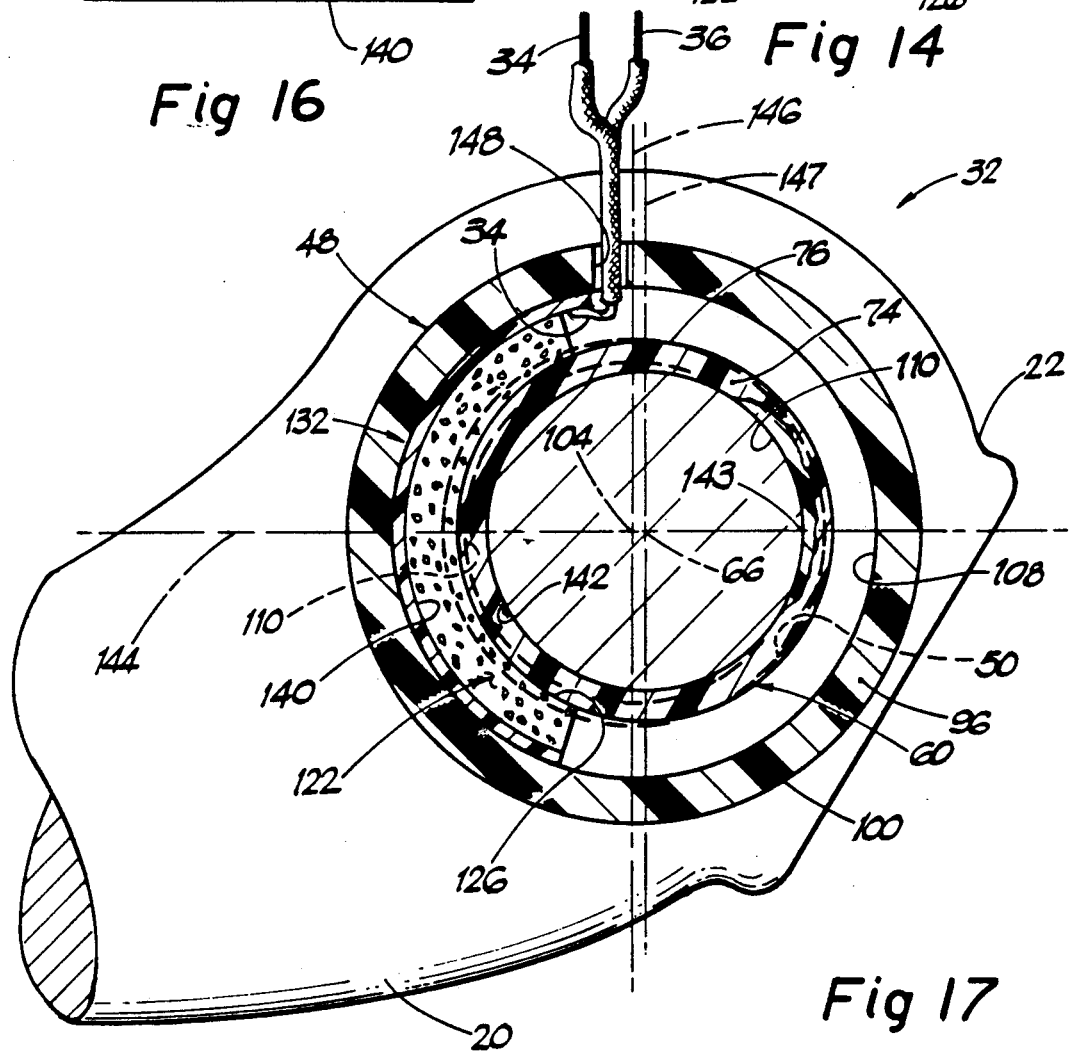
FIG. 17 is a cross-sectional view taken generally on the plane of line 17—17 of FIG. 4 and looking in the directions of the arrows.

FIGS. 13 and 14 illustrate another element shown in FIG. 4 (as well as in FIG. 17). More specifically a backing member or force distribution member 122 is depicted in FIGS. 13 and 14 as being of a generally parallelepiped configuration having relatively wide opposite surfaces 124 and 126 and relatively narrow opposite side or edge surfaces 128 and 130. In the preferred embodiment, member 122 is comprised of rubber or any other suitable elastomeric material.

FIGS. 15 and 16 illustrate a force sensor cell 132 which, in the embodiment disclosed comprises a force sensing resistor. Generally, such a force sensing resistor 132 may comprise two sheets of polymer film with one of such sheets having a set of conductive interdigitating fingers terminating in two electrical terminals or leads 134 and 136. On the other sheet, an electrically resistive film is applied to one side thereof. The two sheets are then brought together as to have the resistive film lie across and against the conductive finger network of the first mentioned sheet thereby forming what may be considered a sandwich-like construction. Applying a force to the resulting sandwich construction causes the electrical resistance as between the contacts or terminals 134 and 136 to decrease. In FIG. 15, the darkened area 138 is intended to generally designate the area wherein the conductive finger network and cooperating resistive film may be located. In the preferred embodiment, the lower surface 140 of the lower (as in FIG. 16) sheet would be provided with a suitable adhesive. Such a force sensing resistor may be obtained, as for example, from Interlink Electronics, Inc. having an address of 535 E. Montecito Street, Santa Barbara, Calif.

Referring to both FIGS. 4 and 17, the housing or brake force transmitting member 48 is shown having its smaller tubular body portion 98 received within the aperture or passage 50, formed through the brake rod 20, in a manner whereby the outer cylindrical surface 102 is preferably press-fitted into and against the cooperating cylindrical surface of aperture 50. At this time the radially extending annular surface 106 may be juxtaposed to or in contact with the brake actuating rod 20. The brake lever or arm pin 52 is closely received through the cooperating aperture 56 in brake lever 12 in a manner whereby the head 54, thereof, effectively abuts against brake lever 12 while the cylindrical shank portion 142 thereof slides through an annular spacer 42, if such be desired, and loosely slides through the cylindrical passage 110 of member 48. At this point, as possibly best seen in FIG. 4, it should be mentioned that at least in the area where the outer cylindrical surface of cylindrical shank portion 142 is in juxtaposition to passage 110 of member 48, the inner diameter of cylindrical passage 110 is a selected amount larger than the outer diameter of cylindrical shank portion 142. By way of example, and not limitation the difference between the outer diameter of shank portion 142 and the inner diameter of passage 110 may be in the order of 0.016 inch (0.41 mm.). For purposes of clarity and ease of description, FIGS. 4 and 17 may be considered as representing two different states or conditions of the braking system. That is, in FIG. 4, wherein arrow A indicates the direction of travel by the brake rod means 20, during energization of the vehicular brakes, and wherein arrow B indicates the general direction of travel by the brake lever 12 during energization of the vehicular brakes, the assembly of FIG. 4 depicts what may be considered some intermediate condition of vehicular brake application by the vehicular driver during which the outer cylindrical surface of shank 142 is not in contact with inner cylindrical surface 110 as appears either above or below the axis 66. FIG. 17, in comparison, illustrates the same elements, as shown in FIG. 4, in what may be considered as a null or inactivated state of vehicular brake energization with, at that time, the outer cylindrical surface of shank 142 resting against the inner cylindrical surface 110, as at a point 143 situated as on the horizontally depicted axis 144, as at where it is crossed by the vertical axis 147, thereby describing a crescent-like space between the shank 142 and surface 110 as depicted generally left of the vertical axis 146 in FIG. 17. In the condition depicted in FIG. 17, the axis 66 of shank 142 would be displaced generally to the right of axis 104 of member 48 (as viewed in FIG. 17).

In the preferred arrangement, force sensitive resistor means or cell 132 is suitably secured as by, for example, an adhesive to the inner cylindrical surface 108 of housing or brake force transmitting member 48 as to be located and positioned as generally depicted in FIGS. 4 and 17. The elastomeric or backing member 122 may then be applied, adhesively, onto the force sensitive resistor means or cell 132 as to be located and positioned as also generally depicted in FIGS. 4 and 17. A suitable clearance aperture or passage 148 may be formed through the wall 96 of member 48 and the conductors 34 and 36 (also see FIG. 2) drawn therethrough as to have the ends thereof respectively electrically connected to contacts or terminals 134 and 136 of force responsive cell 132.

Cover or bearing member 60, being aligned or positioned as best shown in FIG. 4, slides axially into inner cylindrical surface 108 of member 48. The arms 82 and 84 of member 60 first override the cooperating tab-like portions 118 and 120 and finally abutably engage such portions 118 and 120 by respective reception thereof in arm apertures 86 and 88. Thus assembled, with elastomeric member 122 abutting outer cylindrical surface 76 of member 60, and cell member 132 abutting inner cylindrical surface 108 of member 48, and conductors 34 and 36 electrically connected to contacts 134 and 136, the entire assembly unit is slid onto the pin shank 142, with inner cylindrical surface 110 of member 48 being of a clearance condition over pin shank 142. The engagement as between inner cylindrical surface 78 of member 60 and the outer cylindrical surface of shank portion 142 is preferably a light press-fit. As the thusly preassembled unit continues to be moved axially onto shank 142, outer cylindrical surface 102 of member 48 engages with aperture or passage 50 through push rod or member 20 with the engagement of cylindrical surface 102 and passage 50 also preferably being a light press-fit.

Figure 18:
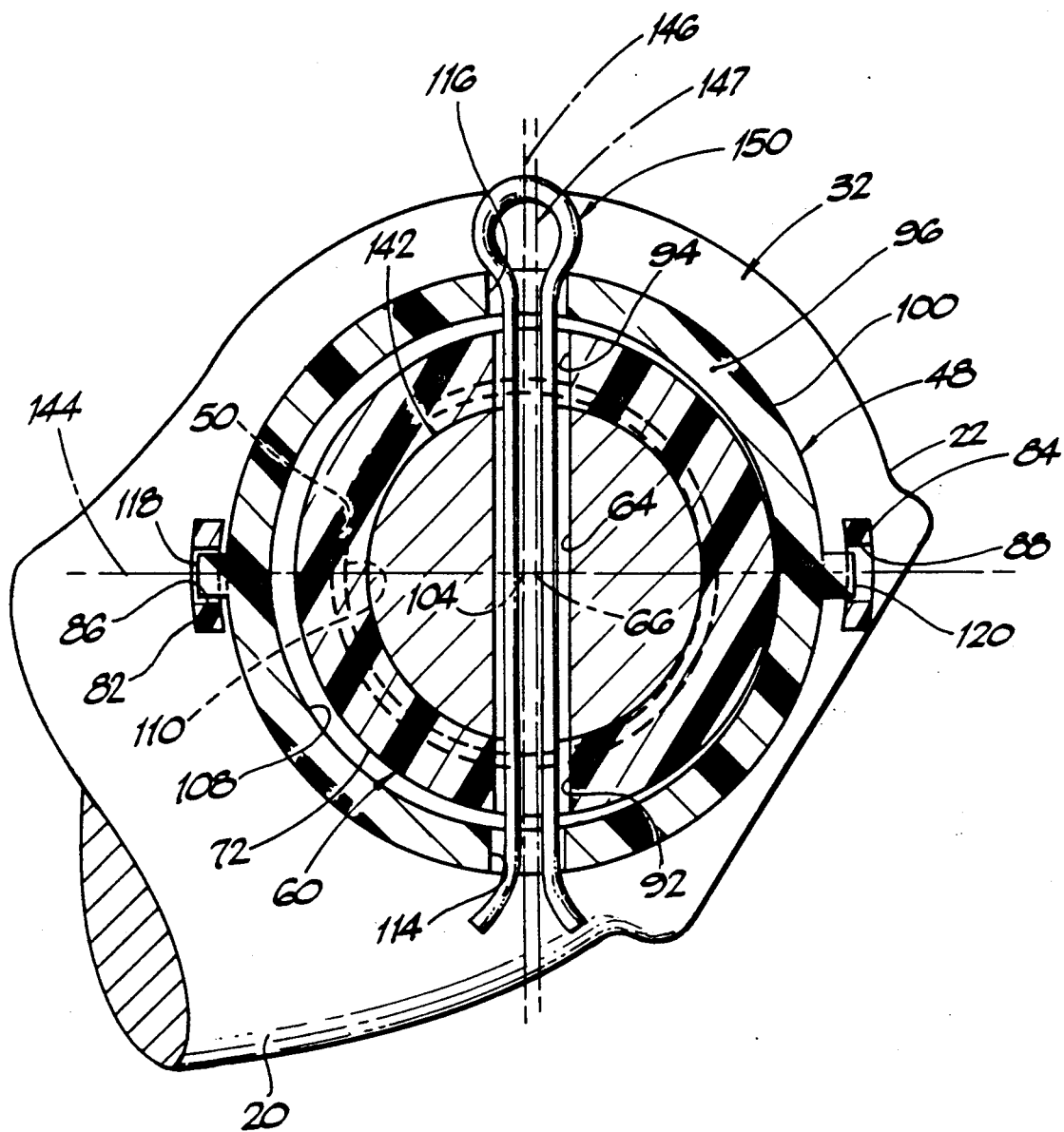
FIG. 18 is a cross-sectional view taken generally on the plane of line 18—18 of FIG. 4 and looking in the direction of the arrows.
Figure 19:
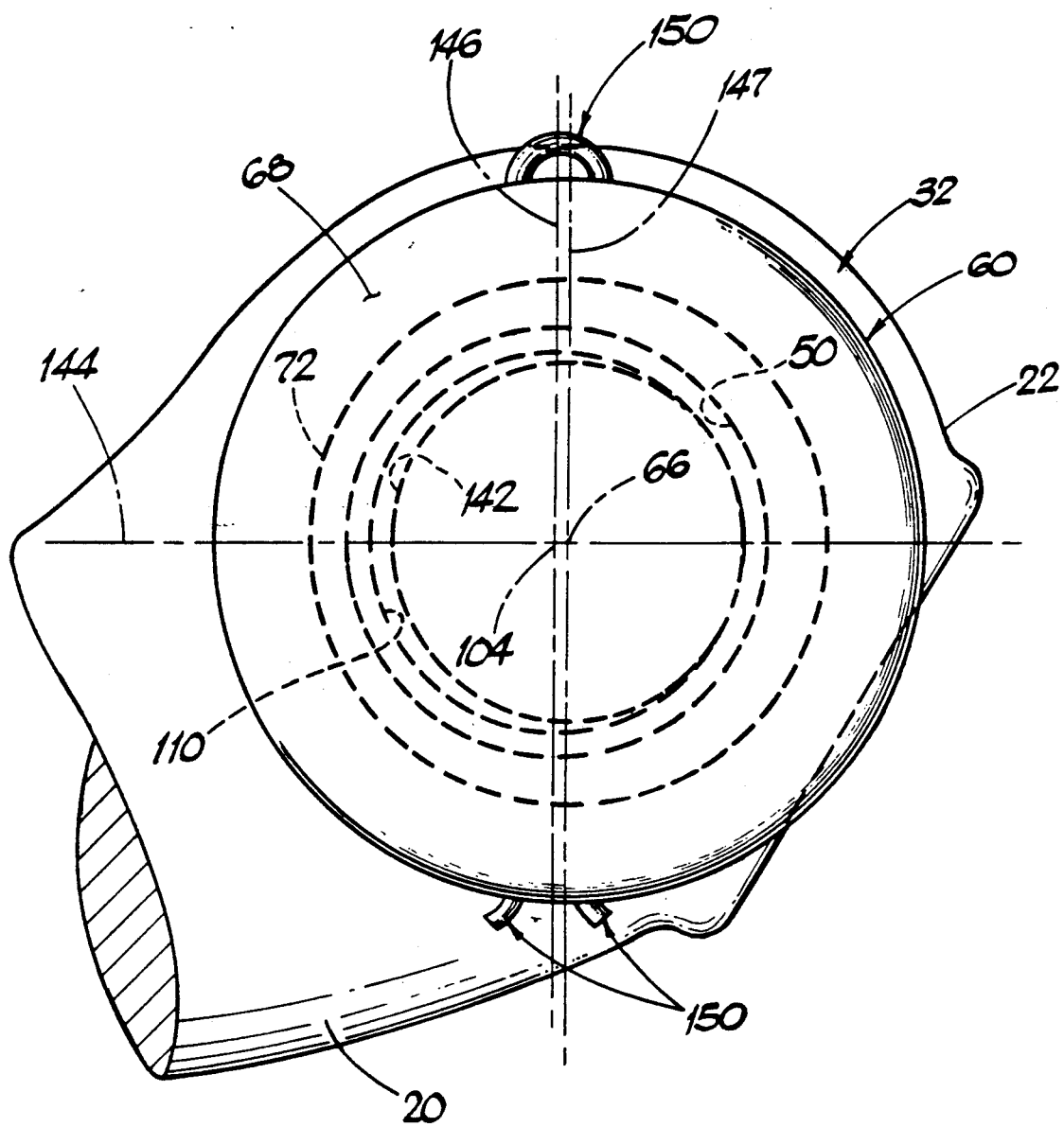
FIG. 19 is an axial end view taken generally on the plane of line 19—19 of FIG. 4 and looking in the direction of the arrows.

In FIG. 18, the various elements shown therein are illustrated in a brake system null operating condition or position corresponding to that of FIG. 17. The direction of movement of the brake rod 20, during energization of the vehicular brake system would be generally to the left (as viewed in FIG. 18) as along, for example, axis 144. Once the various elements are assembled, as described with reference to FIG. 17, passageway 64 in pin shank 142 is in alignment with passages or apertures 92 and 94 of member 60 and, generally, in alignment with passages or apertures 114 and 116 of member 48. However, during the depicted unactivated state of brake application, the centers 104 and 66 are slightly spaced from each other thereby resulting in apertures 114 and 116 likewise being somewhat eccentrically situated with respect to passageway 64 and apertures 92 and 94. Preferably, suitable locking means such as, for example, a cotter pin or key 150 is inserted into such aligned apertures and passage to thereby prevent accidental disengagement as between and among members 48 and 60 and pin 52.

Operation of the Structures of FIGS. 2–19

As should now be apparent, when the vehicular brake lever 12 is in its inactive state the lever 12 will be in its solid-line position as depicted in FIG. 2 and the various elements comprising the sensor assembly 32 will be in positions as generally depicted in and described with reference to FIG. 17. Also, as should now be apparent, because of the differences in diametrical sizes of: (a) inner cylindrical passage 110 and cylindrical shank 142; (b) cylindrical surfaces 76 and 108; (c) cylindrical surface 72 and the radially inward surfaces of arms 82 and 84; and (d) cylindrical surfaces 72 and 78, the various elements are able to experience relative movement transversely of axis 104 and/or 66. However, because of the somewhat resilient preload caused by the elastomeric means 122, member 60 and pin or journal 52 are, during a de-energized mode of the brake lever 12, effectively held in their right-most position as depicted in and described with reference to FIG. 17. It is only during application or energization of the vehicular braking system that the member 60 and pin 52 move transversely and toward the left, as viewed in FIG. 17, relatively away from the contact point 143 and toward a contact as between pin 142 and surface 110, at the diametrically opposite area.

More specifically, let it be assumed that the associated vehicle is in motion and that the driver desires to bring the vehicle to a stop. The sequence of events, generally, would be as follow.

The driver would step against the brake lever pad 18 causing the brake lever 12 to start to pivotally rotate as toward the depicted phantom line position of FIG. 2. Such movement, of course, also initiates movement of the brake rod 20 toward the left (as viewed in FIG. 2) and as the brake rod 20 starts to so move, a resistance to further movement of rod 20 comes into existance. The resistance, generally, is the reactive force of the remaining portion of the vehicular braking system and, generally, the magnitude of such reactive force is related to the force being applied by the driver against the brake pedal pad 18.

Consequently, once braking force is being applied to the brake lever pad 18 causing clockwise rotation of the brake lever 12 while a reactive resistive force (in a generally opposite direction) is being applied by the brake rod 20 tending to prevent further clockwise rotation of brake lever 12. Referring to each of FIGS. 2, 4 and 17, it can be seen that as the brake lever 12 is further or more forcefully depressed (as in the direction of arrow B of FIG. 4) the reactive resistive force of brake rod 20 is actually experienced in a direction opposite to arrow A of FIG. 4. This then causes the previously discussed relative transverse movement whereby pin 52 and number 60 move (generally in the directions of arrows A and B of FIG. 4) close to having pin shank 142 becoming engaged against cylindrical surface 110 (as in the area above axis 66 of FIG. 4). Such relative transverse movement causes the force sensitive resistance means 132 to experience an increasing magnitude of force thereagainst resulting, in the embodiment disclosed, in the related decrease of resistance across terminals or contacts 134 and 136. As the resistance is thusly progressively diminished in value, the resulting voltage across conductors 34 and 36 becomes sufficient to trigger suitable related logic type circuit means 388 which, in turn, enables the vehicular source of emf 40 to energize the various control means of FIG. 1. Generally, when the driver subsequently releases the brake lever 12, the brake actuating force, is of course, eliminated thereby immediately eliminating the prior existing compressive force experienced by the force sensitive resistance means 132 and, simultaneously enabling the elastomeric means 122 to again position the components as generally depicted in FIGS. 17 and 18. Such elimination of the brake actuating force and the concomittant elimination of the corresponding related magnitudes of compressive force experienced by the force sensitive resistance means 132 returns the force sensitive resistance means 132 to a relative high state of resistance and the resulting loss of voltage as across conductor means 34 and 36 becomes insufficient to cause the logic circuit means 388 to continue energization of the associated control means of FIG. 1.

As should now be apparent, the structure of FIGS. 2–19 provides a means and system for appropriately energizing associated logic control means 388 and the related control means 348, 346, 380, 384, 370 and 354 without the necessity of employing any mechanical type electrical switch means, often subject to failure, and without the necessity of employing any hydraulic pressure responsive switch means which, tool, are often subject to failure. Further, unlike the prior art, the invention does not depend upon the employment of movable electrical contacts which are susceptible to corrosion and/or electrical pitting as well as mechanical failure. Also, for all practical purposes the structure of FIGS. 2–19 provides an assembly which is, by design, inherently resistive to the intrusion of dirt and or moisture and the degree to which such may intrude into the overall assembly, the operation thereof is not significantly impaired.

Further, as previously mentioned, it is not unusual for a driver to rest the driver's foot against the brake pedal pad either directly thereon or at an angular position relative thereto. In prior art systems this was usually sufficient to cause energization of the vehicular stop lights. However, this does not occur with the invention since the force thusly applied by the driver's resting foot (on brake pedal pad 18), even if in a direction as depicted by arrow B of FIG. 4, would normally be insufficient to develop a force on the force sensing resistor 132 of a magnitude which would reduce the resistance across terminals 134 and 136 to the preselected magnitude resulting in energization of stop lights 42, 44 and 46. Further, if the driver's foot rests against the brake pedal pad 18 at an angle thereto, only the component of the force thereof directed in the direction of arrow B of FIG. 4 is effective toward creating a force against the force sensing resistor means 132 and such component is even less in magnitude and therefore insufficient to sufficiently load the force sensing resistor means 132 as to cause energization of the stop lights 42, 44 and 46.

Figure 20:
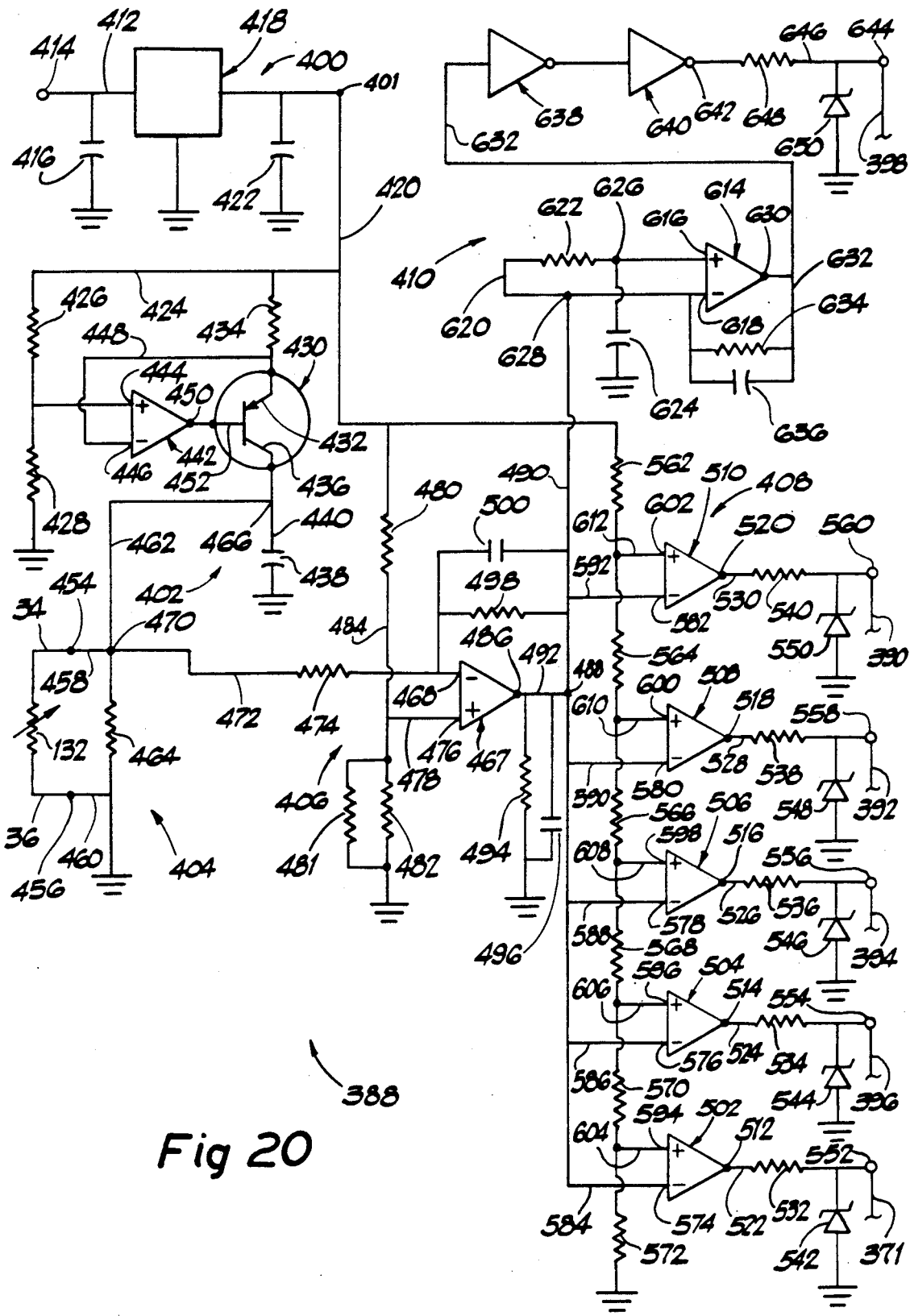
FIG. 20 is a schematic wiring diagram illustrating in greater detail one of electrical logic or control means diagrammatically depicted in FIG. 1.

Referring now in greater detail to FIG. 20, the logic or control circuit means 388 is illustrated as comprising what may be considered, generally, functional sub-circuits. That is: (a) voltage regulator means is depicted generally at 400; (b) a constant current source is illustrated at 402; (c) the force sensitive resistance means 132 input is shown generally at 404; (d) a signal conditioning and amplifying circuit means is shown generally at 406; (e) a comparator network and outputs are generally depicted at 408 and (f) an anti-skid network is depicted generally at 410.

More particularly, the voltage regulator means comprises conductor means 412 having an input, as a terminal 414, electrically connected to a vehicular supply voltage, which may be the depicted source of emf 40 in FIG. 2, and to capacitor means 416 and an integrated voltage regulator 418 which may be a model LM2930 regulator obtainable as a standard commercial item from National Semiconductor Co. The output terminal of regulator 418 is electrically connected to conductor means 420 to which a second capacitor 422 is connected.

The constant current source or network 402 is illustrated as comprising conductor means 424 connected to conductor 420 and having series arranged resistors 426 and 428 serving as a voltage divider. A PNP transistor 430 has its emitter 432 connected to conductor means 424 as through a resistor 434 while the collector 436 is connected to a capacitor 438 as via conductor means 440. An operational amplifier 442 has its positive terminal 444 connected to the voltage divider as between resistors 426 and 428 while its negative terminal 446 is connected as via conductor means 448 to a point as between resistor 434 and emitter 432. The output 450 of operational amplifier 442 is electrically connected to the base 452 of transistor 430.

In the input signal circuitry 404, the force sensitive resistance means 132, of FIG. 4 and 17, is shown with its leads 34 and 36 connected as to suitable terminal means 454 and 456 respectively of conductor means 458 and 460 in turn electrically connected to conductor means 462, having a resistor 464 therein, and leading to a point 466 in conductor 440 as between collector 436 and capacitor 438. As should be apparent the variable force sensitive resistance means 132 and the resistor 464 are in parallel with each other the ultimate result of which is to produce an operational input signal, resulting from the action of the force sensitive resistance means 132, which is of a linearity characteristic improved over that which would probably be obtained if the parallel resistor 464 were not employed. Further, the inclusion of the parallel resistor 464 provides voltage limitation to the input network 404.

The signal conditioning and amplifying circuit means generally at 406 is illustrated as comprising a second operational amplifier 467 having its negative terminal 468 electrically connected to a point 470 of conductor means 462 as via conductor means 472 having resistor means 474 therein. The positive terminal 476 of operational amplifier 467 is electrically connected, via conductor means 478 to a point between a resistor 480 and series situated parallel resistors 481 and 482 in conductor means 484 leading from conductor means 420 to ground potential. The output 486 of amplifier 467 is electrically connected to a point 488 of a conductor 490 as by conductor means 492 to which, in parallel, are connected resistor 494 and capacitor 496. A feed-back resistor 498 and capacitor 500 in parallel therewith are electrically connected to negative terminal 468 and to conductor means 490.

The comparator network and outputs, generally depicted at 408, is illustrated as comprising a plurality of operational amplifiers, functioning as voltage comparators, 502, 504, 506, 508 and 510 having respective outputs 512, 514, 516, 518 and 520 which, in turn, are electrically connected to respective conductor means 522, 524, 526, 528 and 530 and, further, respectively having series resistors 532, 534, 536, 538 and 540. Zener diodes 542, 544, 546, 548 and 550 are respectively connected to conductor means 522, 524, 526, 528 and 530 as at respective points between the related resistors and output terminal means 552, 554, 556, 558 and 560 leading to or electrically connected to conductor means 371, 396, 394, 392 and 390, respectively (also see FIGS. 1 and 2). Conductor means 420 is provided with a plurality of series arranged resistors 562, 564, 566, 568, 570 and 572 leading to ground potential. The respective negative terminals 574, 576, 578, 580 and 582 (operational amplifiers 502-510) are electrically connected, as via conductor means 584, 586, 588, 590 and 592 to conductor means 490. The respective positive terminals 594, 596, 598, 600 and 602 (operational amplifiers 502-510) are electrically connected as via conductor means 604, 606, 608, 610 and 612 to conductor means 420 as at respective points between adjacent series resistors. That is, conductor means 612 is connected to a point between resistors 562 and 564, conductor means 610 is connected to a point between resistors 564 and 566, conductor means 608 is connected to a point between resistors 566 and 568, conductor means 606 is connected to a point between resistors 568 and 570 and conductor means 604 is connected to a point between resistors 570 and 572.

The anti-skid network 410 is illustrated as comprising an operational amplifier 614 having its positive terminal 616 and its negative terminal 618 electrically connected to each other by conductor means 620 which includes a series resistor 622 therein. A capacitor 624 is connected to conductor means 620 as at a point 626 between resistor 622 and positive terminal 616. As depicted conductor means 490 is electrically connected to conductor means 620 as at a point 628 generally between resistor 622 and negative terminal 618. The output 630 of operational amplifier 614 is electrically connected to conductor means 632 and a feed-back resistor 634 and capacitor 636 are connected to both the negative terminal 618 and conductor means 632. Conductor 632 leads to the input of a first inverter 638 the output of which leads to the input of a second inverter 640. The output 642 of inverter 640 is electrically connected as to a terminal 644 via conductor means 646 having a series resistor 648. A zener diode 650 is connected to conductor means 646 as between resistor 648 and terminal 644 which, in turn, is depicted as electrically connected to conductor means 398 (also see FIGS. 1 and 2).

In the embodiment of FIG. 20, the various components may have values and/or be identified as to their types and sources as follows:

| | | | |
|---|---|---|---|
| Resistor 426: | 5% | ¼ watt; | 300K |
| Resistor 428: | 5% | ¼ watt; | 1.2M |
| Resistor 434: | 5% | ¼ watt; | 300K |
| Resistor 464: | 5% | ¼ watt; | 20K |
| Resistor 474: | 5% | ¼ watt; | 300 ohms |
| Resistor 480: | 1% | ¼ watt; | 7.5K |
| Resistor 481: | 1% | ¼ watt; | 7.5K |
| Resistor 482: | 1% | ¼ watt; | 2.11K |
| Resistor 498: | 1% | ¼ watt; | 30.1K |
| Resistor 494: | 1% | ¼ watt; | 7.5K |
| Resistor 562: | 1% | ¼ watt; | 110K |
| Resistor 622: | 1% | ¼ watt; | 1.0M |
| Resistor 634: | 1% | ¼ watt; | 100K |
| Resistor 564: | 1% | ¼ watt; | 69.8K |
| Resistor 566: | 1% | ¼ watt; | 49.9K |
| Resistor 568: | 1% | ¼ watt; | 20K |
| Resistor 570: | 1% | ¼ watt; | 20K |
| Resistor 572: | 1% | ¼ watt; | 100K |
| Capacitor 416: | 0.1 mf | 20% | 50 V. |
| Capacitor 422: | 10 mf | 20% | 25 V. |
| Capacitor 438: | 100 pf | 5% | 100 V. |
| Capacitor 500: | 100 pf | 5% | 100 V. |
| Capacitor 496: | 100 pf | 5% | 100 V. |
| Capacitor 624: | 0.6 mf | 20% | 25 V. |
| Capacitor 636: | 100 pf | 5% | 100 V. |

Each of the zener diodes could be 500mW., 5.1 volt type 1N5231B; transistor means 430 could be type MPS-A55 PNP; voltage regulator 418 could be type LM2930-8 (8 volt regulator) obtainable from National Semiconductor Co. of Santa Clara, Calif.; operational amplifiers 442, 467, 510 and 614 could be type TLC274 obtainable from Texas Instruments, Inc. of Dallas, Tex.; hex inverters 638 and 640 could be type 4069UB obtainable from Motorola Semiconductor Products, Inc. of Phoenix, Ariz.; and operational amplifiers 502, 504, 506 and 508 could be type TLC274 obtainable from said Texas Instruments, Inc.

Figure 21:
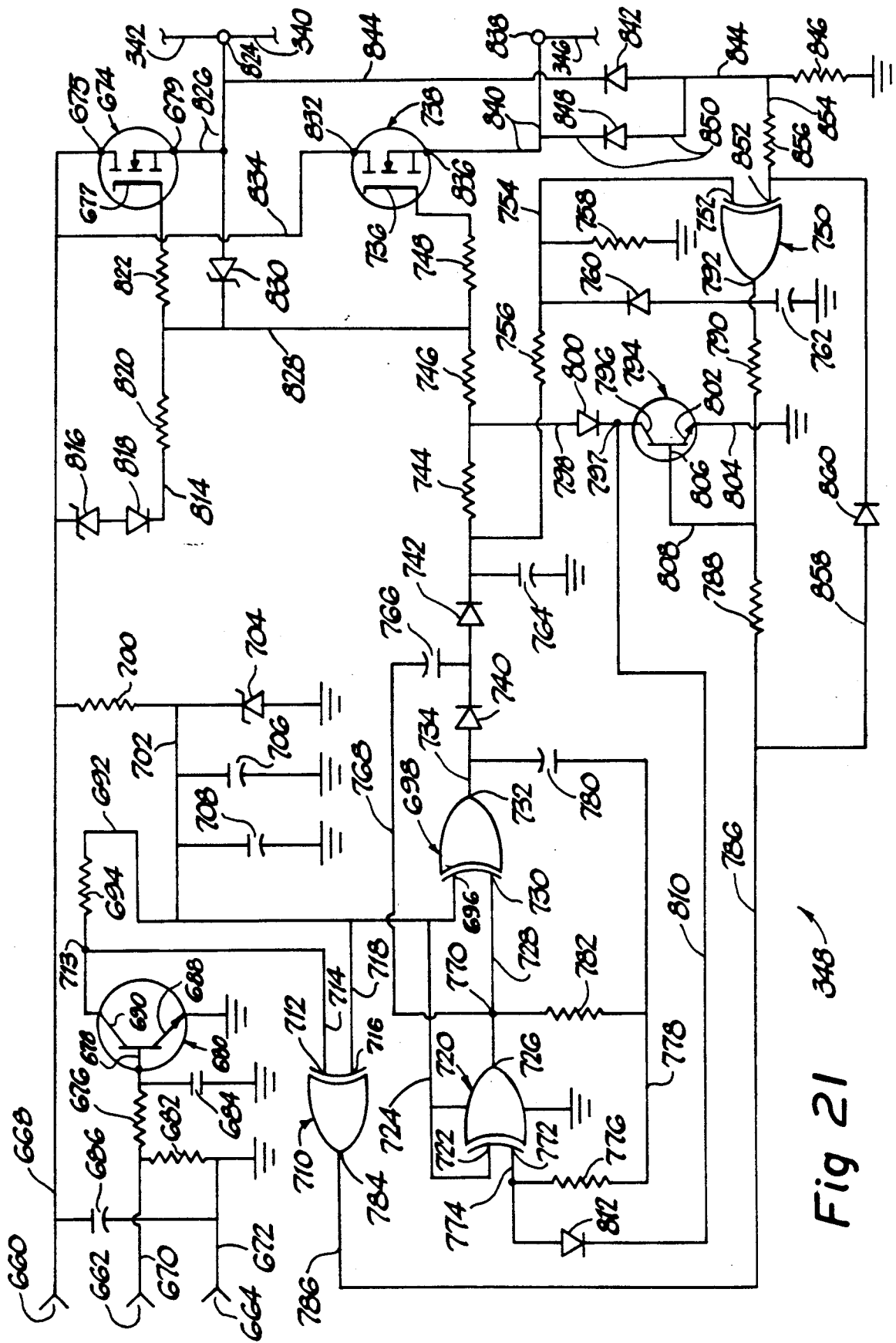
FIG. 21 is a schematic wiring diagram illustrating in greater detail another of the electrical means diagrammatically depicted in FIG. 1.

FIG. 21 is a schematic wiring diagram of the control means 348 of FIGS. 1 and 2. Referring in greater detail to FIG. 21, the control means 348 is illustrated as comprising terminal means 660, 662 and 664 with such respectively connected to and comprising conductor means 668, 670 and 672. Conductor 668 is connected to a terminal of a field-effect transistor 674 while conductor 670 including a series resistor 676 is connected to the base 678 of an NPN transistor 680. One end of a resistor 682 is connected to conductor means 670, as between terminal 662 and resistor 676, while its other end, connected as to conductor means 672, is brought to ground potential. A first capacitor 684 is electrically connected as across base terminal 678 and ground potential while a second capacitor 686 is connected across conductors 668 and 672. The emitter 688 of transistor 680 is brought to ground while the collector 690 is connected to conductor means 692, including resistor 694, leading to an input 696 of an Exclusive-OR gate 698. A resistor 700 is connected at one end to conductor 668 and, through conductor means 702, connected at its other end to conductor means 692. A zener diode 704 and capacitors 706 and 708 are each connected to conductor means 702 and brought to ground potential.

A second Exclusive-OR gate 710 has one of its terminals 712 connected as via conductor means 714 to conductor 692 as at a point between collector 690 and resistor 694 while its other terminal 716 is connected via conductor means 718 to conductor 692 as between resistor 694 and terminal 696 of gate 698.

A third Exclusive-OR gate 720 has one of its input terminals 722 electrically connected via conductor means 724 to conductor means 692 as at a point between resistor 694 and an input terminal 696 of Exclusive-OR gate 698. The output terminal 726 of gate 720 is connected via conductor means 728 to the other input terminal 730 of gate 698.

The output terminal 732 of gate 698 is electrically connected by conductor means 734 to the gate 736 of a second field-effect transistor 738 and such conductor means 734 is illustrated as comprising series arranged diodes 740 and 742, and resistors 744, 746 and 748.

A fourth Exclusive-OR gate 750 has one of its terminals 752 connected to conductor means 734, as at a point between diode 742 and resistor 744, as by conductor means 754 comprising a resistor 756 therein. A resistor 758, connected at one end to conductor 754 as between resistor 756 and terminal 752, has its other end at ground potential. Conductor 754 also has connected to it a diode 760 and capacitor 762, in series, leading to ground.

A capacitor 764, connected at one side to conductor 734 as between diode 742 and resistor 744, has its other side at ground while another capacitor 766 having one side connected to conductor 734 as between diodes 740 and 742 has its other side connected, as via conductor means 768, to conductor 728 as at point 770.

The other terminal 772 of gate 720, as through conductor means 774, has one end of a resistor 776 connected thereto while the other end of resistor 776 is connected to conductor means 778 leading to one side of a capacitor 780 having its other side connected to conductor means 734 as between output 732 and diode 740. A resistor 782 has its opposite ends respectively connected to conductor 728 and to conductor 778 as at a point between resistor 776 and capacitor 780.

The output terminal 784 of gate 710 is electrically connected as by conductor means 786, comprising series resistors 788 and 790, to the output terminal 792 of gate 750. An NPN Darlington transistor 794 has its collector 796 connected to conductor 734, at a point between resistors 744 and 746, as by conductor means 798 comprising a diode 800. The emitter 802 of transistor 794 is brought to ground potential as through conductor means 804 while the base 806 is electrically connected to conductor means 786, at a point between resistors 788 and 790, as by conductor means 808. A conductor 810, connected to conductor means 798 as between diode 800 and collector 796, comprises a diode 812 and is connected to terminal 772 of gate 720 as through conductor means 774.

Conductor means 814, comprising series arranged zener diode 816, diode 818 and resistors 820 and 822, is connected to conductor 668 at one end at a point generally between terminal 660 and drain terminal 675 of field-effect transistor 674 while, at its other end being connected to the gate 677 of transistor 674. The source terminal 679 of transistor 674 is connected to an output terminal 824 as by conductor means 826. A conductor 828 is connected at its opposite ends to conductor means 814 and 734, respectively, as at respective points between resistors 820 and 822 and between resistors 746 and 748. A zener diode 830 is electrically placed across conductors 828 and 826.

Transistor 738 drain terminal 832 is electrically connected, generally in parallel with terminal 675, to conductor 668, as by conductor means 834 while its source terminal 836 is connected to an output terminal 838 as by conductor means 840. A diode 842 is connected via conductor means 844 to conductor means 826 as at a point between source terminal 679 and output terminal 824 and further connected to resistance means 846 leading to ground. Similarly, a diode 848, through its conductor means 850, is connected to conductor 840, as between source terminal 836 and output terminal 838, and to conductor means 844, as between diode 842 and resistor 846.

Terminal 852 of gate 792 is connected by conductor means 854, comprising resistance means 856, to conductor means 844 as between diode 842 and resistor 846. Further, conductor means 858, comprising a diode 860, is connected at one end to conductor means 786, as between gate 710 output 784 and resistor 788, and, at its other end connected to conductor means 854 as between resistor 856 and terminal 852 of gate 750.

The terminal or connection 660 leads as to the vehicular battery 40 (FIG. 2); terminal or connection 662 leads to conductor 396 (FIGS. 1 and 20) while terminal or connection 664 leads to ground potential. Further, at the right side of FIG. 21, terminal 824 is depicted as operatively connected to conductors 340 and 342 (FIG. 1) while terminal 838 is depicted as operatively connected to conductor 346 (FIG. 1).

In the embodiment of FIG. 21, the various components may have values and/or be identified as to their types and sources as follows;

| Resistor 682: | 5% | ¼ watt; | 10K |
|---|---|---|---|
| Resistor 676: | 5% | ¼ watt; | 100K |
| Resistor 700: | 5% | ¼ watt; | 330 ohms |
| Resistor 820: | 5% | ¼ watt; | 1K |
| Resistor 822: | 5% | ¼ watt; | 100 ohms |
| Resistor 776: | 5% | ¼ watt; | 1 Meg. |
| Resistor 782: | 5% | ¼ watt; | 430K |
| Resistor 744: | 5% | ¼ watt; | 100K |
| Resistor 746: | 5% | ¼ watt; | 10K |
| Resistor 756: | 5% | ¼ watt; | 4.7K |
| Resistor 748: | 5% | ¼ watt; | 100K |
| Resistor 758: | 5% | ¼ watt; | 100K |
| Resistor 788: | 5% | ¼ watt; | 100K |
| Resistor 790: | 5% | ¼ watt; | 100K |
| Resistor 856: | 5% | ¼ watt; | 100K |
| Resistor 846: | 5% | ¼ watt; | 100K |

Zener diode 704 may be type 1N5248 (18 volt, 10%, ½ watt); zener diode 816 may be type 1N5254 (27 volt, 10%, ½ watt); zener diode 830 may be type 1N5248 (18 volt, 10%, ½ watt); and diodes 818, 812, 740, 742, 860, 800, 760, 848 and 842 may each be general purpose type 1N4148.

| Capacitor 686: | 0.1 mf | 10% | 50 V. |
|---|---|---|---|
| Capacitor 684: | 0.01 mf | 10% | 50 V. |
| Capacitor 708: | 100 mf | 20% | 25 V. |
| Capacitor 706: | 0.01 mf | 10% | 50 V. |
| Capacitor 780: | 0.001 mf | 10% | 50 V. |
| Capacitor 766: | 0.1 mf | 10% | 50 V. |
| Capacitor 764: | 0.1 mf | 10% | 50 V. |
| Capacitor 762: | 0.01 mf | 10% | 50 V. |

Field-effect transistor 674 may be type 1RF-Z40 while field-effect transistor 738 may be type 1RF-RO22 both of which may be obtained as commercially available items from International Rectifier Corp. (If desired both 674 and 738 may be type 1RF-Z40.) Transistor 794 may be a type MPS-A13 NPN Darlington transistor. Gates 710, 720, 698 and 750 may be an integrated circuit quad-chip type 4070B CMOS Exclusive-OR gate and transistor 680 may be of a type MPS-A05 NPN transistor.

Brief Description of Operation of Disclosure of FIG. 20

In the logic and control circuitry 388 of FIG. 20, with point 414 connected as to a vehicular source of emf 40, point 401 may be considered as existing at 8.0 volts. Of course, the resistors 562, 564, 566, 568, 570 and 572 cause related voltage drops thereacross. Resistors 426 and 434 are in parallel with each other (426 being one of two resistors—the other one being 428—of a voltage divider) and both are connected to conductor 420 at a point where the voltage is at 8.0 volts. The current flow through resistor 434 and the emitter-collector circuit of transistor 430 is maintained constant by the output of operational amplifier 442. That is, the output of amplifier 442 is made responsive to any trend toward a change in voltage across resistor 434 compared to 426 and in response thereto the output of amplifier 442 alters or regulates the emitter-to-base voltage of transistor 430 to thereby maintain a constant current flow through resistor 434 and the emitter-collector of transistor 430.

The network 404 comprised of the force sensitive resistor (FSR) 132 and parallel resistor 464 provides a maximum value of resistance when the FSR 132 is not experiencing an operator applied braking force and therefor the magnitude of the voltage at point 470 is at a maximum (since the voltage there will vary inversely with the brake force applied to the FSR 132).

The voltage at point 470 is applied, through resistor 474, to input 468 of operational amplifier 467 and, if it is assumed that the magnitude of the voltage at 470 is still at a maximum, the amplifier 467 will produce an output voltage as at point 488 (of conductor 490) which is, in effect, an absolute minimum magnitude, possibly 1.5 volts, which, in any event is less than the threshold values of any of comparators 502, 504, 506, 508, 510 and 614. Under such a condition of vehicle operation, wherein the driver is not applying a braking force to the vehicular braking system, there are no actuating outputs at any of output terminal means 552, 554, 556, 558, 560 and 644.

Now, let it be assumed that the vehicle is at some relatively high speed and that the driver wishes to bring it rapidly to a stop. As the driver starts and continues to apply a braking force against the brake lever 12 (FIGS. 1 and 2) to a maximum applied force, the magnitude of the resistance across the network 404, starts at the said maximum value but progressively diminishes to an assumed absolute minimum value. Correspondingly, the magnitude of the voltage at point 470 started (with a then not applied braking force) at an assumed absolute maximum value; however, as the value of the resistance across network 404 diminishes (or diminished) because of the driver applying a braking force, the magnitude of the voltage at point 470 progressively diminishes as to an assumed absolute minimum value causing, in turn, operational amplifier 467 to produce an output voltage progressively increasing in magnitude at point 488 on conductor 490.

For purposes of discussion, if it is assumed that vehicular braking has started at zero and progressed to a maximum driver applied braking force, then the magnitude of the voltage at point 488 will have progressed from an initial low value (for example 1.5 volts) to an ultimate high value (assumed to be for example in the order of 5.0 volts).

As the voltage at point 488 thusly increases so, too, does the voltage increase along conductor 490 as well as conductors 620, 592, 590, 588, 586 and 584 leading to the operational amplifier 614 and the respective negative terminals of comparators 502, 504, 506, 508 and 510. Each of such comparators and amplifier 614 have their own respective value of threshold voltage differing in value from all the others. Therefore, as should now be apparent, since under the assumed condition where the magnitude of the voltage at point 488 was insufficient to meet any of the threshold voltage values and now has increased to its maximum value at point 488, all of the threshold voltage values are progressively attained as the voltage at point 488 increases to its maximum value.

Therefore, as soon as a very slight braking force is applied by the driver the threshold of comparator 502 is met and an output signal is provided as at terminal 552. With a slightly increased braking force applied by the driver the threshold of comparator 504 is met and an output signal is provided as at terminal 554 (while the previously developed signal at 552 continues to exist). With a still further increased braking force applied by the driver the threshold of comparator 506 is met and an output signal is provided as at terminal 556 (while the previously developed signals at 552 and 554 continue to exist). With a further increased braking force applied by the driver the threshold of comparator 508 is met and an output signal is provided as at terminal 558 (while the previously developed signals at 552, 554 and 556 continue to exist). With yet a further increased braking force applied by the driver the threshold of comparator 510 is met and an output signal is provided as at terminal 560 (while the previously developed signals at 552, 554, 556 and 558 continue to exist). And when the driver reduces or releases braking force the operational amplifier 614 produces an output at 630 and on conductor 632 which, passing through inverters 638 and 640, ultimately produce a signal at output 644. With some greater specificity in regard to the anti-skid network 410, point 626 temporarily holds the output voltage at 488 of the conditioning and amplifying sub-circuit portion 406 and comparing that value of voltage with the instantaneous output voltage of amplifier 467 at the negative terminal 618 of amplifier 614. If the voltage at 618 is less than at 626 the output at 644 pulses indicating a lessening of the applied brake force. The inverters 638 and 640 are employed to generally clear up and normalize the pulse signal.

Brief Description of Operation of Disclosure of FIG. 21

The control means or circuitry 348 of FIG. 21, for ease of discussion and believed increased clarity will, for at least the most part, be discussed or explained in terms of "low" and "high" operational or internal signals.

Terminal 660 may be considered as being connected as to the vehicular source of emf 40 (FIG. 2) while terminal or connection 662 may be considered as operatively connected via conductor means 396 (FIGS. 1 and 20) to terminal 554 (FIG. 20). Terminal or connection 664 is brought to suitable ground potential. Further, when the output signal on terminal 554 (FIG. 20) goes "low" such is intended to be the initiating signal for the operation of circuitry means 348 as by the application of such "low" signal, via conductor means 396, to input 662.

Therefore, with such an operational philosophy being now established, it can be seen that when input 662 is "low" the base 678 of transistor 680 is also "low" preventing conduction through the emitter-collector of transistor 680. Therefore, point 713 becomes "high" resulting in both inputs 712 and 716 of gate 710 becoming "high" while the output 784 thereof becomes "low" and such is applied to conductor means 786 with the result that base 806 of transistor 794 also becoming "low" and transistor 794 then being non-conductive. Consequently, point 797 becomes what may be considered a floating (varying) "high" with such being applied to conductor means 810.

The oscillator, comprised as of 720, 698, 780, 782, 776 and 724 to 696, then becomes a free running multivibrator producing a square wave output as at 732 and the voltage doubler, comprising diodes 740, 742 and capacitors 764, 766, increases the magnitude of the voltage output from the oscillator. Such increased voltage is applied to the gates 736 and 677 of field-effect transistors 738 and 674, respectively, causing the transistors 738 and 674 to become conductive and thereby through terminal 824 cause energization of stop light or lamp assemblies 42 and 44 (FIG. 1) and, through terminal 838, cause energization of a stop light or lamp assembly 46 which is intended to depict a mid-positioned relatively elevated stop lamp assembly as is often employed in present-day automotive vehicles. If, at this time any of the stop lamps 42, 44 or 46 should experience an electrical short, terminal 852 of gate 750 becomes "low" and since terminal 752 of gate 750 was already "high" (through conductor 754), the output 792 of gate 750 becomes "high" thereby causing transistor 794 to become conductive and bringing point 797 to "low" which, in turn, applied via conductor 810 to terminal 772 holds such terminal 772 at "low" thereby stopping further operation of the said oscillator with the consequence that no voltage, from the said oscillator, is supplied to gates 736 and 677 rendering the respective field-effect transistors 738 and 674 non-conductive.

Now still assuming that the vehicle driver has applied a braking force and the stop lamp assemblies 42, 44 and 46 are energized as previously described. If the vehicle driver now terminates the braking force (releasing brake lever 12), the signal on input 662 and transistor base 678 goes "high" causing transistor 680 to become conductive and in so doing causing point 713 to become "low" with such "low" being applied, via conductor means 714, to terminal 712 of gate 710. Since terminal 716 of gate 710 was, and remains, "high" the output at 784 of gate 710 becomes "high" which, through conductor means 786, is applied to base 806 of transistor 794 causing transistor 794 to become conductive and bringing point 797 to "low". When point 797 thusly becomes "low" such is transmitted, via conductor means 810, to terminal 772 of gate 720 holding such terminal 772 "low" and stopping operation of said oscillator which, as previously described, results in transistors 674 and 738 becoming non-conductive and stop light or lamp assemblies 42, 44 and 46 being de-energized.

Overall Operation of the Invention

As should now be apparent, the invention provides a signal generating means responsive to the occurrence of a single event, namely, application of a vehicular braking force by the driver, which in turn is effective for producing a plurality of output or triggering signals respectively effective and capable for causing associated controls and/or accessories to respond to respective ones of such plurality of output signals.

Generally, with particular reference to FIGS. 1, 2, 20 and 21, if a vehicle as at 300 were to have all of the accessories already referred to, the overall operation could be described as follows. Of course, it should be remembered that as the brake pedal 12 is pressed with an increasing force, the value of the resistance of FSR 132 progressively changes therewith and that such progressive change in resistance value is employed at discrete values, to in turn create what may be considered triggering points or values.

Assuming that the engine 302 is operating and that the transmission selector lever 378 is in either its "park" or "neutral" position, the interlock control 380 will prevent the selector lever 378 to be moved therefrom to any operating position whether forward or rearward drive. The driver then applies a force against brake lever 12 until the magnitude of the force is sufficient to create an output signal as at terminal 560 (FIG. 20) which signal is transmitted via conductor 390 to interlock control means 380 de-activating the interlock 380 and permitting the driver to move the selector lever 378 to a desired operating position.

Now let it be assumed that the vehicle 300 is traveling along a roadway and first reaches a speed whereat the control means 384 becomes effective for causing the transmission 308 torque converter to lock-up into a solid drive train and let it be further assumed that at some still greater speed the driver engages the vehicular speed or cruise control 370 to thereby automatically maintain a selected vehicular speed. If at such conditions the driver then decides, for some reason to either bring the vehicle to a stop, or generally substantially reduce the speed of the vehicle as to a speed possibly below which the torque converter should not remain in a lock-up state, the driver applies a braking force against the brake lever 12 and almost immediately the change in resistance of the FSR 132 is such as to cause a signal to be first produced as at terminal 552 (FIG. 20) with such being transmitted via conductor means 371 to the cruise control 370 causing de-activation of such cruise control. As the magnitude of the driver applied braking force continues the value of the FSR 132 resistance progressively changes to where a signal is produced as at terminal 556 (FIG. 20) with such being transmitted via conductor means 394 to the transmission torque converter interlock control 384 resulting in the control 384 disengaging the lock-up condition of the transmission torque converter.

Further, especially if the vehicle is traveling relatively fast and then undergoes severe vehicular braking, the front of the vehicle may tend to excessively move downwardly. However, at such braking conditions, the driver applied braking force and the resulting change in FSR 132 resistance is sufficient to cause an output signal at terminal 558 (FIG. 20) which via conductor means 392 is applied to the anti-dive control means 354 which, consequently appropriately energizes the anti-dive means 350 and 352 precluding excessive downward movement of the vehicle during such stopping phase.

Also, as specifically described with reference to FIG. 20, when the brake pedal experiences a reduction in driver-applied force thereto, the resulting changed value of FSR 132 resistance causing a signal to be applied as to terminal 644 (FIG. 20) and transmitted via conductor means 398 to the anti-skid control means 364 which, in turn, is operatively connected to the anti-skid devices, associated with wheel brake assemblies 324, 326, 328 and 330 as by suitable transmission means 362, 360, 368 and 366.

As should now be apparent, in all of the foregoing described vehicular braking operations, the stop light or lamp assemblies 42, 44 and 46 become energized by virtue of the signal generated at terminal 554 (FIG. 20) with the detailed description of such energization and de-energization of lamp assemblies 42, 44 and 46 having been made with reference to FIG. 21.

The invention has been disclosed and described in an environment where many specifically identified vehicular accessories and/or controls are disclosed and intended to be responsive to the varying signal generated by the driver's brake-applying force. It should be made clear that the invention may be practiced in combination with some, all or more of such accessories and/or controls as may be associated with the vehicle 300.

Although only a preferred embodiment of the invention has been disclosed and described, it is apparent that other embodiments and modifications of the invention are possible within the scope of the appended claims.

What is claimed is:

1. A braking and accessory control system for a vehicle having accessory means, comprising an arrangement effective for creating output signals, said arrangement comprising a first movable element, a second movable element, said first movable element being operatively connected to and effective for moving said second movable element, signal generating means effective for indicating when preselected magnitudes of a first force are applied to said first movable element when said first movable element is operatively engaging and at least urging said second movable element to move, said signal generating means comprising force sensitive electrical resistance means, wherein said force sensitive electrical resistance means varies its electrical resistance in response to the magnitudes of forces applied thereto, and wherein said force sensitive electrical resistance means is situated as to have applied thereagainst a reaction-force of a magnitude dependent upon the magnitude of said first force being applied in increasing magnitudes to said first movable element, said force sensitive electrical resistance means being effective upon said reaction-force attaining preselected magnitudes to produce related magnitudes of electrical resistance resulting in an output signal of varying electrical magnitude indicative of the corresponding attainment of said preselected magnitudes by said first force applied to said first movable element, and wherein said output signal is effective for initiating a response in said accessory means of said vehicle, wherein said first movable element comprises a manually actuatable vehicular brake lever, wherein said second movable element comprises a vehicular brake system actuating linkage, wherein said brake lever is pivotally mounted by first pivot means at least near a first of its ends to associated vehicular support structure as to have a second of its ends opposite to said first end generally freely swingable, wherein said actuating linkage is operatively connected to said brake lever by second pivot means, wherein one of said pivot means comprises said force sensitive resistance means, and further comprising first logic control electrical circuit means electrically connected to said force sensitive resistance means, second electrical circuit means electrically connected to said first circuit means, vehicular stop lamp means, wherein said accessory means comprises vehicular anti-skid brake system control means, wherein when said force sensitive resistance means produces an output signal of a first preselected electrical magnitude said first circuit means causes a first electrical control signal to be applied to said second circuit means to cause energization of said second circuit means and thereby energization of said vehicular stop lamp means, wherein when said force sensitive resistance means produces an output signal of a second preselected electrical magnitude said first circuit means causes a second electrical control signal to be applied to said vehicular anti-skid brake system control means, and wherein said first circuit means is effective to maintain energization of said second circuit means and said vehicular stop lamp means as the magnitude of said output signal changes from said first preselected electrical magnitude to said second preselected electrical magnitude.

2. A braking and accessory control system for a vehicle according to claim 1 wherein said first circuit means comprises voltage regulator means for connection to a source of electrical potential and for supplying a regulated voltage output, first sub-circuit means electrically connected to said voltage regulator means for thereby being supplied by said regulated voltage output and effective for in turn supplying a constant current output, second sub-circuit means for electrical connection to said force sensitive resistance means and electrically connected from electrical ground potential to a point existing at said constant current provided by said constant current output, third sub-circuit means comprising voltage signal conditioning and amplifying means, wherein said voltage signal conditioning and amplifying means comprises operational amplifier means having output terminal means and first and second inputs, wherein said first input is electrically connected to a point electrically between said first sub-circuit means and said second sub-circuit means as to thereby have applied to said first input a voltage signal indicative of the then value of electrical resistance of said force sensitive resistance means, wherein said second input is electrically connected to a source of voltage which is a fraction of the magnitude of said regulated voltage output, fourth sub-circuit means comprising comparator network means, said comparator network means comprising at least first and second operational comparators each having first and second input terminals and an output terminal, wherein the first input terminals of each of said operational comparators are electrically connected to the output terminal means of said operation amplifier means, wherein the second input terminal of said first operational comparator is electrically connected via first resistor means to said regulated voltage output, wherein the second input terminal of said second operational comparator is electrically connected via second resistor means to said output terminal means of said operational amplifier means, wherein the output terminal of said first operational comparator is electrically connected to said second circuit means, and wherein the output terminal of said second operational comparator is electrically connected to said vehicular anti-skid brake system control means.

3. A braking and accessory control system for a vehicle according to claim 1 wherein said accessory means comprises vehicular cruise control means, wherein when said force sensitive resistance means produces an output signal of a third preselected electrical magnitude said first circuit means causes a third electrical control signal to be applied to said vehicular cruise control means.

4. A braking and accessory control system for a vehicle according to claim 3 wherein said first circuit means causes said third electrical control signal to be applied to said vehicular cruise control means before said first circuit means causes said first electrical control signal to be applied to said second circuit means.

5. A braking and accessory control system for a vehicle according to claim 3 wherein said accessory means comprises vehicular automatic power transmission torque converter lock-up control means, wherein when said force sensitive resistance means produces an output signal of a fourth preselected electrical magnitude said first circuit means causes a fourth electrical control signal to be applied to said vehicular automatic power transmission torque converter lock-up control means.

6. A braking and accessory control system for a vehicle according to claim 5 wherein said first circuit means causes said first electrical control signal to be applied to said second circuit means before said first circuit means causes said fourth electrical control signal to be applied to said vehicular automatic power transmission torque converter lock-up control means.

7. A braking and accessory control system for a vehicle according to claim 5 wherein said first circuit means comprises voltage regulator means for connection to a source of electrical potential and for supplying a regulated voltage output, first sub-circuit means electrically connected to said voltage regulator means for thereby being supplied by said regulated voltage output and effective for in turn supplying a constant current output, second sub-circuit means for electrical connection to said force sensitive resistance means and electrically connected from electrical ground potential to a point existing at said constant current provided by said constant current output, third sub-circuit means comprising voltage signal conditioning and amplifying means, wherein said voltage signal conditioning and amplifying means comprises operational amplifier means having output terminal means and first and second inputs, wherein said first input is electrically connected to a point electrically between said first sub-circuit means and said second sub-circuit means as to thereby have applied to said first input a voltage signal indicative of the then value of electrical resistance of said force sensitive resistance means, wherein said second input is electrically connected to a source of voltage which is a fraction of the magnitude of said regulated voltage output, fourth sub-circuit means comprising comparator network means, said comparator network means comprising at least first second third and fourth operational comparators each having first and second input terminals and an output terminal, wherein the first input terminals of each of said operational comparators are electrically connected to the output terminal means of said operational amplifier means, wherein the second input terminal of said first operational comparator is electrically connected via first resistor means to said regulated voltage output, wherein the second input terminal of said second operational comparator is electrically connected via second resistor means to said output terminal means of said operational amplifier means, wherein the second input terminal of said third operational comparator is electrically connected via third resistor means to said regulated voltage output, wherein the second input terminal of said fourth operational comparator is electrically connected via fourth resistor means to said regulated voltage output, wherein the output terminal of said first operational comparator is electrically connected to said second circuit means, wherein the output terminal of said second operational comparator is electrically connected to said vehicular anti-skid brake system control means, wherein the output terminal of said third operational comparator is electrically connected to said vehicular cruise control means, and wherein the output terminal of said fourth operational comparator is electrically connected to said vehicular automatic power transmission torque converter lock-up control means.

8. A braking and accessory control system for a vehicle according to claim 3 wherein said accessory means comprises vehicular anti-dive suspension control means, wherein when said force sensitive resistance means produces an output signal of a fifth preselected electrical magnitude said first circuit means causes a fifth electrical control signal to be applied to said vehicular anti-dive suspension control means.

9. A braking and accessory control system for a vehicle according to claim 8 wherein said first circuit means causes said fifth electrical control signal to be applied to said vehicular anti-dive suspension control means before said first circuit means causes said second electrical control signal to be applied to said anti-skid brake system control means.

10. A braking and accessory control system for a vehicle according to claim 8 wherein said first circuit means comprises voltage regulator means for connection to a source of electrical potential and for supplying a regulated voltage output, first sub-circuit means electrically connected to said voltage regulator means for thereby being supplied by said regulated voltage output and effective for in turn supplying a constant current output, second sub-circuit means for electrical connection to said force sensitive resistance means and electrically connected from electrical ground potential to a point existing at said constant current provided by said constant current output, third sub-circuit means comprising voltage signal conditioning and amplifying means, wherein said voltage signal conditioning and amplifying means comprises operational amplifier means having output terminal means and first and second inputs, wherein said first input is electrically connected to a point electrically between said first sub-circuit means and said second sub-circuit means as to thereby have applied to said first input a voltage signal indicative of the then value of electrical resistance of said force sensitive resistance means, wherein said second input is electrically connected to a source of voltage which is a fraction of the magnitude of said regulated voltage output, fourth sub-circuit means comprising comparator network means, said comparator network means comprising at least first second third fourth and fifth operational comparators each having first and second input terminals and an output terminal, wherein the first input terminals of each of said operational comparators are electrically connected to the output terminal means of said operational amplifier means, wherein the second input terminal of said first operational comparator is electrically connected via first resistor means to said regulated voltage output, wherein the second input terminal of said second operational comparator is electrically connected via second resistor means to said output terminal means of said operational amplifier means, wherein the second input terminal of said third operational comparator is electrically connected via third resistor means to said regulated voltage output, wherein the second input terminal of said fourth operational comparator is electrically connected via fourth resistor means to said regulated voltage output, wherein the second input terminal of said fifth operational comparator is electrically connected via fifth resistor means to said regulated voltage output, wherein the output terminal of said first operational comparator is electrically connected to said second circuit means, wherein the output terminal of said second operational comparator is electrically connected to said vehicular anti-skid brake system control means, wherein the output terminal of said third operational comparator is electrically connected to said vehicular cruise control means, wherein the output terminal of said fourth operational comparator is electrically connected to said vehicular automatic power transmission torque converter lock-up control means, and wherein the output terminal of said fifth operational comparator is electrically connected to said vehicular anti-dive suspension control means.

11. A braking and accessory control system for a vehicle according to claim 3 wherein said accessory means comprises vehicular automatic power transmission selector lever interlock control means, wherein when said force sensitive resistance means produces an output signal of a sixth preselected electrical magnitude said first circuit means causes a sixth electrical control signal to be applied to said vehicular automatic power transmission selector lever interlock control means.

12. A braking and accessory control system for a vehicle according to claim 11 wherein said first circuit means causes said first electrical control signal to be applied to said second circuit means before said first circuit means causes said sixth electrical control signal to be applied to said vehicular automatic power transmission selector lever interlock control means.

13. A braking and accessory control system for a vehicle according to claim 11 wherein said accessory means comprises vehicular automatic power transmission torque converter lock-up control means, wherein said accessory means comprises vehicular anti-dive suspension control means, wherein said first circuit means comprises voltage regulator means for connection to a source of electrical potential and for supplying a regulated voltage output, first sub-circuit means electrically connected to said voltage regulator means for thereby being supplied by said regulated voltage output and effective for in turn supplying a constant current output, second sub-circuit means for electrical connection to said force sensitive resistance means and electrically connected from electrical ground potential to a point existing at said constant current provided by said constant current output, third sub-circuit means comprising voltage signal conditioning and amplifying means, wherein said voltage signal conditioning and amplifying means comprises operational amplifier means having output terminal means and first and second inputs, wherein said first input is electrically connected to a point electrically between said first sub-circuit means and said second sub-circuit means as to thereby have applied to said first input a voltage signal indicative of the then value of electrical resistance of said force sensitive resistance means, wherein said second input is electrically connected to a source of voltage which is a fraction of the magnitude of said regulated voltage output, fourth sub-circuit means comprising comparator network means, said comparator network means comprising at least six operational comparators each having first and second input terminals and an output terminal, wherein the first input terminals of each of said operational comparators are electrically connected to the output terminal means of said operational amplifier means, wherein the second input terminal of a first of said operational comparators is electrically connected via first resistor means to said regulated voltage output, wherein the second input terminal of a second of said operational comparators is electrically connected via second resistor means to said output terminal means of said operational amplifier means, wherein the second input terminal of a third of said operational comparators is electrically connected via third resistor means to said regulated voltage output, wherein the second input terminal of a fourth of said operational comparators is electrically connected via fourth resistor means to said regulated voltage output, wherein the second input terminal of a fifth of said operational comparators is electrically connected via fifth resistor means to said regulated voltage output, wherein the second input terminal of a sixth of said operational comparators is electrically connected via sixth resistor means to said regulated voltage output, wherein the output terminal of said first operational comparator is electrically connected to said second circuit means, wherein the output terminal of said second operational comparator is electrically connected to said vehicular anti-skid brake system control means, wherein the output terminal of said third operational comparator is electrically connected to said vehicular cruise control means, wherein the output terminal of said fourth operational comparator is electrically connected to said vehicular automatic power transmission torque converter lock-up control means, wherein the output terminal of said fifth operational comparator is electrically connected to said vehicular anti-dive suspension control means, and wherein the output terminal of said sixth operational comparator is electrically connected to said vehicular power transmission selector lever interlock control means.

14. A braking and accessory control system for a vehicle according to claim 3 wherein said first circuit means comprises voltage regulator means for connection to a source of electrical potential and for supplying a regulated voltage output, first sub-circuit means electrically connected to said voltage regulator means for thereby being supplied by said regulated voltage output and effective for in turn supplying a constant current output, second sub-circuit means for electrical connection to said force sensitive resistance means and electrically connected from electrical ground potential to a point existing at said constant current provided by said constant current output, third sub-circuit means comprising voltage signal conditioning and amplifying means, wherein said voltage signal conditioning and amplifying means comprises operational amplifier means having output terminal means and first and second inputs, wherein said first input is electrically connected to a point electrically between said first sub-circuit means and said second sub-circuit means as to thereby have applied to said first input a voltage signal indicative of the then value of electrical resistance of said force sensitive resistance means, wherein said second input is electrically connected to a source of voltage which is a fraction of the magnitude of said regulated voltage output, fourth sub-circuit means comprising comparator network means, said comparator network means comprising at least first, second and third operational comparators each having first and second input terminals and an output terminal, wherein the first input terminals of each of said operational comparators are electrically connected to the output terminal means of said operational amplifier means, wherein the second input terminal of said first operational comparator is electrically connected via first resistor means to said regulated voltage output, wherein the second input terminal of said second operational comparator is electrically connected via second resistor means to said output terminal means of said operational amplifier means, wherein the second input terminal of said third operational comparator is electrically connected via third resistor means to said regulated voltage output, wherein the output terminal of said first operational comparator is electrically connected to said second circuit means, wherein the output terminal of said second operational comparator is electrically connected to said vehicular anti-skid brake system control means, and wherein the output terminal of said third operational comparator is electrically connected to said vehicular cruise control means.

15. The combination of a vehicular braking system, vehicular accessory means and vehicular accessory control system, comprising manually actuatable brake actuator means, said brake actuator means being effective upon manual application of an actuating force thereagainst for energization of said vehicular braking system, electrical sensor means operatively connected to said brake actuator means, said electrical sensor means being effective to produce an electrical signal of variable values, wherein the value of said electrical signal is indicative of the magnitude of said actuating force then being applied to said brake actuator means, wherein said vehicular accessory control system comprises electrical logic circuit means electrically connected to said electrical sensor means as to be responsive to said electrical signal and electrically connected to said vehicular accessory means, wherein said accessory means comprises a plurality of vehicular accessories, and wherein said logic circuit means is effective for selectively applying a control signal to respective ones of said plurality of accessories in accordance with and in response to said value of said electrical signal produced by said electrical sensor means.

16. The combination according to claim 15 wherein said plurality of vehicular accessories comprises vehicular stop lamp means and stop lamp energizing electrical circuit means, and vehicular cruise control means, and wherein the magnitude of said value of said electrical signal produced by said electrical sensor means is such as to cause said logic circuit means to apply a control signal first to said vehicular cruise control means and thereafter apply a control signal to said stop lamp energizing electrical circuit means for energization of said vehicular stop lamp means.

17. The combination according to claim 15 wherein said plurality of vehicular accessories comprises vehicular stop lamp means and stop lamp energizing electrical circuit means, and vehicular automatic power transmission torque converter lock-up control means, and wherein the magnitude of said value of said electrical signal produced by said electrical sensor means is such as to cause said logic circuit means to apply a control signal first to said stop lamp energizing electrical circuit means for energization of said vehicular stop lamp means and thereafter apply a control signal to said vehicular automatic power transmission torque converter lock-up control means.

18. The combination according to claim 15 wherein said plurality of vehicular accessories comprises vehicular cruise control means, vehicular stop lamp means and stop lamp energizing electrical circuit means, and vehicular automatic power transmission torque converter lock-up control means, and wherein the magnitude of said value of said electrical signal produced by said electrical sensor means is such as to cause said logic circuit means to apply a control signal first to said vehicular cruise control means and said stop lamp energizing electrical circuit means for energization of said vehicular stop lamp means and thereafter apply a control signal to said vehicular automatic power transmission torque converter lock-up control means.

19. The combination according to claim 15 wherein said brake actuator means comprises pedal means pivotally mounted in said vehicle for manually initiating the braking system, wherein said braking system comprises master cylinder means, a force transmitting pin-like member carried by said pedal means for movement in unison therewith, push rod means for translating the arcuate motion of said pedal means into linear motion for actuation of said master cylinder means, force transmitting means carried by said push rod means for movement in unison therewith, wherein said force transmitting pin-like member is at least partly received in said force transmitting means, wherein a space exists as between juxtaposed surfaces of said force transmitting pin-like member and said force transmitting means, wherein said electrical sensor means comprises force sensitive electrical resistance means and elastomeric means collectively urging said juxtaposed surfaces toward abutting engagement with each other when said pedal means is not being manually actuated, wherein said force sensitive electrical resistance means is adapted for operative connection to a source of electrical potential and to said electrical logic circuit means, wherein when said pedal means is manually actuated all of the force manually applied to said pedal means is transmitted from said force transmitting pin-like member through said elastomeric means and through said force sensitive electrical resistance means to said force transmitting means and to said push rod means for actuation of said master cylinder means, wherein when said force sensitive electrical resistance means has preselected magnitudes of force applied thereagainst the electrically resistive value thereof attains corresponding magnitudes of electrical resistance, wherein said corresponding magnitudes of electrical resistance comprise said electrical signal, wherein said logic circuit means comprises voltage regulator means for connection to a source of electrical potential and for supplying a regulated voltage output, first sub-circuit means electrically connected to said voltage regulator means for thereby being supplied by said regulated voltage output and effective for in turn supplying a constant current output, second sub-circuit means for electrical connection to said force sensitive resistance means and electrically connected from electrical ground potential to a point existing at said constant current provided by said constant current output, third sub-circuit means comprising voltage signal conditioning and amplifying means, wherein said voltage signal conditioning and amplifying means comprises operational amplifier means having output terminal means and first and second inputs, wherein said first input is electrically connected to a point electrically between said first sub-circuit means and said second sub-circuit means as to thereby have applied to said first input a voltage signal indicative of the then value of electrical resistance of said force sensitive resistance means, wherein said second input is electrically connected to a source of voltage which is a fraction of the magnitude of said regulated voltage output, fourth sub-circuit means comprising comparator network means, said comparator network means comprising at least first and second operational comparators each having first and second input terminals and an output terminal, wherein the first input terminals of each of said operational comparators are electrically connected to the output terminal means of said operational amplifier means, wherein the second input terminal of said first operational comparator is electrically connected via first resistor means to said regulated voltage output, wherein the second input terminal of said second operational comparator is electrically connected via second resistor means to said output terminal means of said operational amplifier means, and wherein the output terminals of each of said operational comparators are electrically connected to said respective ones of said plurality of accessories.

20. The combination of a vehicular braking system, vehicular accessory means and vehicular accessory control system, comprising manually actuatable brake actuator means, said brake actuator means being effective upon manual application of an actuating force thereagainst for energization of said vehicular braking system, electrical sensor means, means for applying to said electrical sensor means a force the magnitude of which is dependent upon said actuating force, said electrical sensor means being effective to produce an electrical signal of variable values, wherein the value of said electrical signal is indicative of the magnitude of said actuating force then being applied to said brake actuator means, wherein said vehicular accessory control system comprises electrical logic circuit means electrically connected to said electrical sensor means as to be responsive to said electrical signal and electrically connected to said vehicular accessory means, wherein said accessory means comprises a plurality of vehicular accessories, and wherein said logic circuit means is effective for selectively applying a control signal to respective ones of said plurality of accessories in accordance with and in response to said value of said electrical signal produced by said electrical sensor means.

21. A braking and accessory control system for a vehicle having accessory means, comprising a pivotal connector for pivotally connecting first and second members to each other and for creating an output signal indicative of an external force being applied to one of said first and second members and reacted against by the other of said first and second members, comprising first pivot-like means having a longitudinal axis and operatively joining said first and second members, force transmitting surface means carried by one of said first and second members, wherein said force transmitting surface means is situated generally to one side of said longitudinal axis, reaction force surface means carried by the other of said first and second members, means effective during periods of time when no external force is being applied to said one of said first and second members for translationally moving said first pivot-like means in a first direction generally diametrically opposite to said one side of said longitudinal axis, force sensitive electrical resistance means situated between and operatively contained by said force transmitting surface means and said reaction force surface means, said force sensitive resistance means being adapted for operative connection to a source of electrical potential and to associated operational electrical circuit means, wherein when an external force is being applied to said one of said first and second members said first pivot-like means is translationally moved in a second direction generally opposite to said first direction, wherein when said first pivot-like means translationally moves in said second direction said force transmitting surface means and said reaction force surface means are caused to be brought closer to each other, wherein as said force transmitting surface means and said reaction force surface means are brought closer to each other said force sensitive electrical resistance means operatively contained therebetween experiences a compressive force related to the magnitude of said external force being applied to said one of said first and second members, wherein as said force sensitive electrical resistance means experiences said compressive force the electrically resistive value thereof varies thereby causing a related electrical signal to be available for application to said associated operational electrical circuit means, wherein said first member comprises a manually actuatable vehicular brake lever, wherein said second member comprises a vehicular brake system actuating linkage, wherein said brake lever is pivotally mounted by second pivot-like means at least near a first of its ends to associated vehicular support structure as to have a second of its ends opposite to said first end generally freely swingable, wherein said actuating linkage is operatively connected to said brake lever by said first pivot-like means, wherein said associated operational electrical circuit means comprises first logic control electrical circuit means electrically connected to said force sensitive resistance means, second electrical circuit means electrically connected to said first circuit means, vehicular stop lamp means, wherein said accessory means comprises vehicular anti-skid brake system control means, wherein when said related electrical signal is of a first preselected electrical magnitude said first circuit means causes a first electrical control signal to be applied to said second circuit means to cause energization of said second circuit means and thereby energization of said vehicular stop lamp means, wherein when said related electrical signal is of a second preselected electrical magnitude said first circuit means causes a second electrical control signal to be applied to said vehicular anti-skid brake system control means, and wherein said first circuit means is effective to maintain energization of said second circuit means and said vehicular stop lamp means as the magnitude of said related electrical signal changes from said first preselected electrical magnitude to said second preselected electrical magnitude.

22. Circuit means for receiving an electrical signal generated in response to the braking of a vehicle by the application of a brake-actuating force by the operator of said vehicle and in turn causing electrical energization of associated vehicular accessory means, comprising first signal generating means for generating an electrical output signal of a magnitude reflective of the magnitude of the brake-actuating force being applied by said operator, wherein said vehicular accessory means comprises vehicular anti-skid brake system control means, voltage regulator means for connection to a source of electrical potential and for supplying a regulated voltage output, first sub-circuit means electrically connected to said voltage regulator means for thereby being supplied by said regulated voltage output and effective for in turn supplying a constant current output, second sub-circuit means for electrical connection to said first signal generating means and electrically connected from electrical ground potential to a point existing at said constant current provided by said constant current output, third sub-circuit means comprising voltage signal conditioning and amplifying means, wherein said voltage signal conditioning and amplifying means comprises operational amplifier means having output terminal means and first and second inputs, wherein said first input is electrically connected to a point electrically between said first sub-circuit means and said second sub-circuit means as to thereby have applied to said first input a voltage signal indicative of the then magnitude of said electrical output signal, wherein said second input is electrically connected to a source of voltage which is a fraction of the magnitude of said regulated voltage output, fourth sub-circuit means comprising comparator network means, said comparator network means comprising at least first and second operational comparators each having first and second input terminals and an output terminal, wherein the first input terminals of each of said operational comparators are electrically connected to the output terminal means of said operational amplifier means, wherein the second input terminal of said first operational comparator is electrically connected via first resistor means to said regulated voltage output, wherein the second input terminal of said second operational comparator is electrically connected via second resistor means to said output terminal means of said operational amplifier means, wherein the output terminal of said first operational comparator is electrically connected to said second circuit means, and wherein the output terminal of said second operational comparator is electrically connected to said vehicular anti-skid brake system control means.

* * * * *

UNITED STATES PATENT AND TRADEMARK OFFICE
CERTIFICATE OF CORRECTION

PATENT NO. : 5,010,972
DATED : April 30, 1991
INVENTOR(S) : Ronald D. Ingraham et al It is certified that error appears in the above-identified patent and that said Letters Patent is hereby corrected as shown below:

Column 7, line 59, change "42" to --- 62 ---.

Column 10, line 43, change "tool" to --- too ---.

Signed and Sealed this

Twenty-second Day of September, 1992

Attest:

DOUGLAS B. COMER

*Attesting Officer*    *Acting Commissioner of Patents and Trademarks*